(12) United States Patent
Takeda et al.

(10) Patent No.: US 11,561,618 B2
(45) Date of Patent: Jan. 24, 2023

(54) INFORMATION PROCESSING DEVICE, INFORMATION PROCESSING METHOD, AND PROGRAM

(71) Applicant: SONY CORPORATION, Tokyo (JP)

(72) Inventors: Hirofumi Takeda, Kanagawa (JP); Shuichiro Nishigori, Tokyo (JP); Shiro Suzuki, Kanagawa (JP); Jun Matsumoto, Kanagawa (JP); Ikuo Yamano, Tokyo (JP); Toshiyuki Nakagawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 13 days.

(21) Appl. No.: 17/262,321

(22) PCT Filed: Jul. 17, 2019

(86) PCT No.: PCT/JP2019/028007
§ 371 (c)(1),
(2) Date: Jan. 22, 2021

(87) PCT Pub. No.: WO2020/026797
PCT Pub. Date: Feb. 6, 2020

(65) Prior Publication Data
US 2021/0294418 A1 Sep. 23, 2021

(30) Foreign Application Priority Data
Jul. 31, 2018 (JP) .............................. JP2018-143251

(51) Int. Cl.
*G06F 3/01* (2006.01)
*G10K 11/178* (2006.01)
*G06F 9/54* (2006.01)

(52) U.S. Cl.
CPC .............. *G06F 3/016* (2013.01); *G06F 9/542* (2013.01); *G10K 11/1781* (2018.01); *G10K 2210/108* (2013.01); *G10K 2210/129* (2013.01)

(58) Field of Classification Search
CPC ..... G06F 3/016; G06F 9/542; G10K 11/1781; G10K 2210/108; G10K 2210/129
See application file for complete search history.

(56) References Cited

U.S. PATENT DOCUMENTS 8,031,059 B2 * 10/2011 Rollins ................ H04N 21/233
340/407.1
8,175,302 B2 * 5/2012 Tanghe ................... H04R 3/14
381/74

(Continued)

FOREIGN PATENT DOCUMENTS

| JP | H08-104297 A | 4/1996 |
|---|---|---|
| JP | 2001-121079 A | 5/2001 |

(Continued)

*Primary Examiner* — Tadesse Hailu
(74) *Attorney, Agent, or Firm* — Paratus Law Group, PLLC

(57) ABSTRACT

There is provided an information processing device, an information processing method, and a program that can suppress hindrance to viewing/listening to content. A control unit controls output of a tactile stimulus in a case where notification information is received during output of content including sound. Further, the control unit performs a process of controlling the tactile stimulus in response to the content or a process of controlling the content in response to the tactile stimulus. The present technology can be applied to, for example, a mobile device such as a smartphone and the like capable of reproducing content including sound.

10 Claims, 14 Drawing Sheets

(56) References Cited

U.S. PATENT DOCUMENTS

| | | | | |
|---|---|---|---|---|
| 9,300,347 B1* | 3/2016 | Coverstone | ........... | G06F 3/0412 |
| 9,665,341 B2* | 5/2017 | Lin | ................... | H04N 21/4305 |
| 11,013,990 B2* | 5/2021 | Nakagawa | ............ | A63F 13/215 |
| 11,145,172 B2* | 10/2021 | Nakagawa | ............... | G08B 6/00 |
| 11,198,059 B2* | 12/2021 | Konishi | .................. | A63F 13/79 |
| 2002/0025838 A1* | 2/2002 | Kawamura | .............. | G08B 6/00 |
| | | | | 455/567 |
| 2003/0109289 A1* | 6/2003 | Ito | ...................... | H04M 19/041 |
| | | | | 455/567 |
| 2005/0036636 A1* | 2/2005 | Noro | .................... | B06B 1/0207 |
| | | | | 381/124 |
| 2010/0142728 A1* | 6/2010 | Honda | ................. | H03G 3/3005 |
| | | | | 381/101 |
| 2012/0169486 A1* | 7/2012 | Sweeney | ................ | H04B 1/385 |
| | | | | 340/384.1 |
| 2012/0224719 A1* | 9/2012 | Johansson | ............ | G08B 7/06 |
| | | | | 381/98 |
| 2013/0326209 A1* | 12/2013 | Dommalapati | ... | H04M 1/72457 |
| | | | | 713/100 |
| 2014/0018049 A1* | 1/2014 | Cannon | .................. | H04W 4/16 |
| | | | | 455/414.1 |
| 2015/0323996 A1* | 11/2015 | Obana | ................. | A63F 13/2145 |
| | | | | 345/177 |
| 2016/0012687 A1* | 1/2016 | Obana | ................... | A63F 13/285 |
| | | | | 340/407.1 |
| 2016/0173683 A1* | 6/2016 | Abreu | .................. | H04L 51/224 |
| | | | | 455/414.1 |
| 2017/0068497 A1* | 3/2017 | Park | ....................... | G06F 3/048 |
| 2017/0353570 A1* | 12/2017 | Hayashi | ................ | H04W 92/08 |
| 2018/0018950 A1* | 1/2018 | Tsuda | .................... | G10H 1/368 |
| 2019/0258316 A1* | 8/2019 | Suzuki | .................. | A61B 34/75 |
| 2020/0036451 A1* | 1/2020 | Gilson | ................. | H04W 8/005 |

FOREIGN PATENT DOCUMENTS

| | | |
|---|---|---|
| JP | 2006-135841 A | 5/2006 |
| JP | 2007-013708 A | 1/2007 |
| JP | 2007-251288 A | 9/2007 |
| JP | 2008-309816 A | 12/2008 |
| JP | 2009-065389 A | 3/2009 |
| JP | 2014-045722 A | 3/2014 |
| JP | 2015-215712 A | 12/2015 |
| WO | WO 2009/028075 A1 | 3/2009 |

* cited by examiner

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2019/028007 (filed on Jul. 17, 2019) under 35 U.S.C. § 371, which claims priority to Japanese Patent Application No. 2018-143251 (filed on Jul. 31, 2018), which are all hereby incorporated by reference in their entirety.

TECHNICAL FIELD

The present technology relates to an information processing device, an information processing method, and a program, and more particularly to an information processing device, an information processing method, and a program that can suppress hindrance to viewing/listening to audio content.

BACKGROUND ART

An electronic device having all of an audio output function of outputting sound, a vibration output function of outputting vibration, and an information communication function of performing communication for exchanging information includes, for example, a smartphone and the like. Further, an electronic device group capable of linking an audio output function, a vibration output function, and an information communication function in real time includes, for example, a combination of a smartphone and a smart watch interlocking with the smartphone and the like. The above-mentioned electronic device and electronic device group are also collectively referred to as an electronic device system.

According to an electronic device system equipped with an audio output function, a vibration output function, and an information communication function, when a user enjoys audio content including music and other sounds by the audio output function, notification of a message received by the information communication function can be reported to the user by output of alarm sound by the audio output function or output of vibration by the vibration output function.

In the electronic device system, in addition to the message, notification information for notifying a user of various contents including highly urgent information such as an incoming call, a sudden change in weather, and the like and less urgent information such as a battery residual quantity, campaign information of a store that a user usually uses, and the like is received (acquired).

For example, Patent Document 1 describes a mobile communication terminal device that sets report sound from a speaker and vibration of a vibrator according to urgency of notification information.

CITATION LIST

Patent Document

Patent Document 1: Japanese Patent Application Laid-Open No. 2009-065389

SUMMARY OF THE INVENTION

Problems to be Solved by the Invention

By the way, in an electronic device system, if notification of notification information (a fact that notification of notification information has been provided) is reported by alarm sound when a user views/listens to audio content, the user hindered from viewing/listening to the audio content. For example, in a case where the audio content is music (a music piece), quality of user's music experience is impaired.

The present technology has been made in view of such a situation, and makes it possible to suppress hindrance to viewing/listening to content.

Solutions to Problems

An information processing device of the present technology is an information processing device including a control unit that controls output of a tactile stimulus in a case where notification information is received during output of content including sound, which the control unit performs a process of controlling the tactile stimulus in response to the content or a process of controlling the content in response to the tactile stimulus. Alternatively, a program of the present technology is a program that allows a computer to function as such an information processing device.

An information processing method of the present technology is an information processing method including performing, using a control unit that controls output of a tactile stimulus in a case where notification information is received during output of content including sound, a process of controlling the tactile stimulus in response to the content or a process of controlling the content in response to the tactile stimulus.

In the information processing device, the information processing method, and the program of the present technology, the output of the tactile stimulus is controlled in a case where the notification information is received during the output of the content including the sound. Further, the process of controlling the tactile stimulus in response to the content or the process of controlling the content in response to the tactile stimulus is performed.

Note that the information processing device may be an independent device or an internal block constituting one device.

In addition, the program can be distributed by transmitting via a transmission medium or by recording on a recording medium.

Effects of the Invention

According to the present technology, it is possible to suppress hindrance to viewing/listening to content.

Note that the effects described here are not necessarily limited, and there may be any effects described in the present disclosure.

MODE FOR CARRYING OUT THE INVENTION

Figure 1:
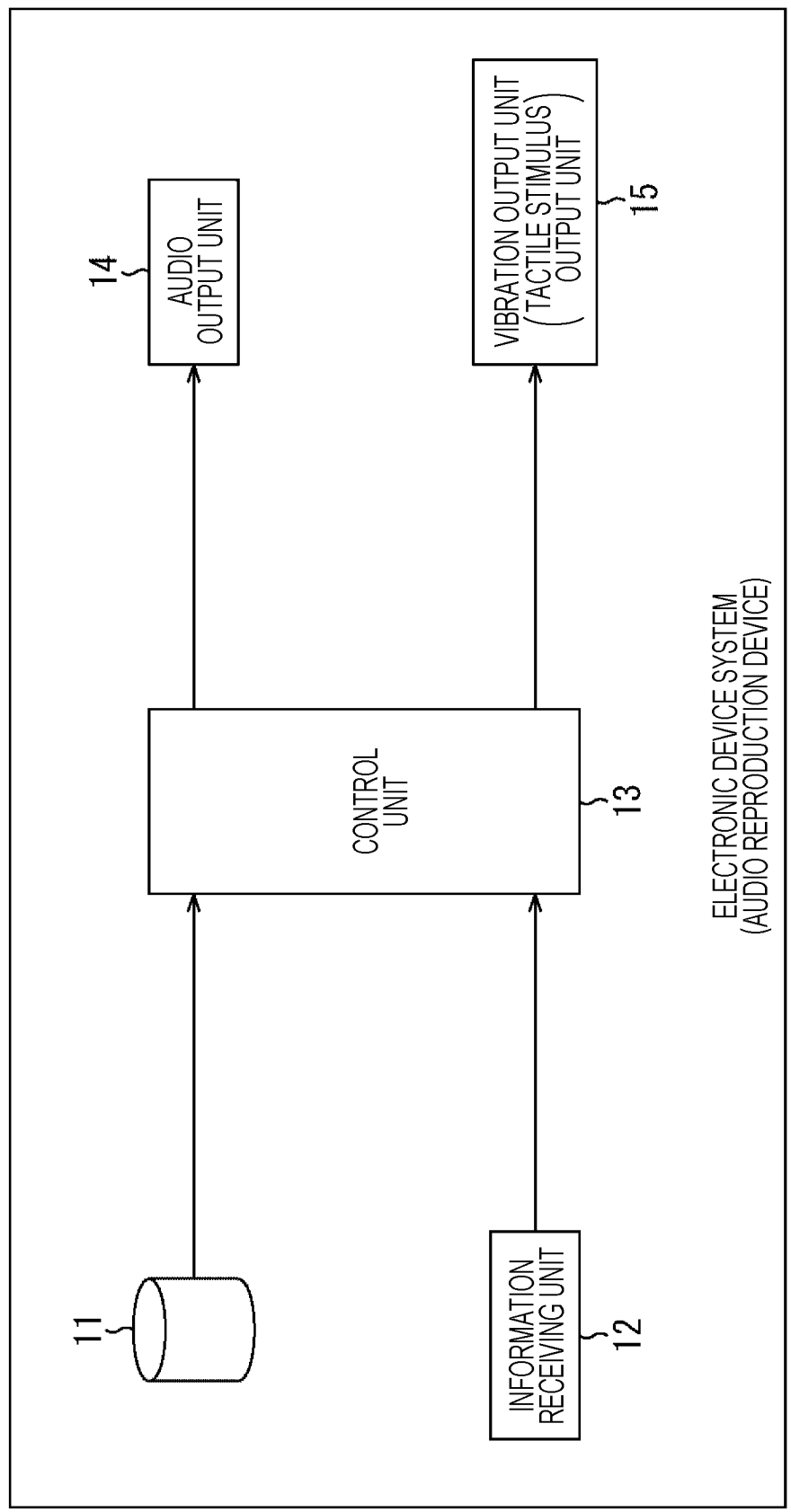
FIG. 1 is a block diagram showing a configuration example of an embodiment of an electronic device system to which the present technology is applied.

One Embodiment of an Electronic Device System to Which the Present Technology is Applied FIG. 1 is a block diagram showing a configuration example of an embodiment of an electronic device system to which the present technology is applied.

In FIG. 1, the electronic device system includes a storage unit 11, an information receiving unit 12, a control unit 13, an audio output unit 14, and a vibration output unit 15, and functions as, for example, an audio reproduction device capable of reproducing sound such as music.

Here, the electronic device system can include one electronic device or a plurality of electronic devices.

In other words, the electronic device system can include, for example, a mobile device such as a smartphone or a mobile player. Further, the electronic device system can include a smartphone or a mobile player and a wearable device interlocking with the smartphone or the mobile player, such as a smart watch or a neck speaker.

In a case where the electronic device system includes, for example, a smartphone and a smart watch, the storage unit 11 to the audio output unit 14 can be built in the smartphone, and the vibration output unit 15 can be built in the smart watch. In a case where the electronic device system includes, for example, a smartphone and a neck speaker, the storage unit 11 to the control unit 13 can be built in the smartphone, and the audio output unit 14 and the vibration output unit 15 can be built in the neck speaker.

The storage unit 11 stores audio content including sound, and reproduces the stored audio content in response to, for example, a user's operation or the like.

Here, the audio content is content that includes at least sound, such as music, an image (a moving image) and sound accompanying the image, and the like. In the following, in order to simplify the explanation, for example, content including only sound such as music will be adopted as the audio content.

Further, a memory built in the electronic device system or a storage medium (for example, a memory card, an optical disk, etc.) that can be attached to and detached from the electronic device can be adopted as the storage unit 11. The audio content can be stored in the storage unit 11 in advance, stored in the storage unit 11 by streaming via a network such as the Internet, or the like.

The information receiving unit 12 receives notification information that a user should be notified by communication via an external network such as the Internet, notification from an application (program) executed by the electronic device system, or the like, and supplies the notification information to the control unit 13. The information receiving unit 12 is, for example, a communication circuit that receives data transmitted by wired communication or wireless communication.

The control unit 13 causes the audio output unit 14 to output sound, the vibration output unit 15 to output vibration, and the like. The control unit 13 is one or multiple processing circuits including, for example, a CPU and a DSP.

For example, the control unit 13 supplies audio content reproduced by the storage unit 11 to the audio output unit 14 and causes the audio output unit 14 to output the audio content. In other words, the control unit 13 supplies an audio signal obtained by reproducing the audio content by the storage unit 11 to the audio output unit 14 and causes the audio output unit 14 to output corresponding sound.

Further, the control unit 13 controls output of a tactile stimulus that reports notification of notification information received by the information receiving unit 12 during output of audio content.

Here, the tactile stimulus is a stimulus that can be sensed by a tactile sense, and includes, for example, vibration, a direct stimulus to a nerve by electricity, a stimulus by air pressure (force sense), a stimulus by temperature, and the like.

The electronic device system can be provided with a tactile stimulus output unit that outputs various tactile stimuli. However, in FIG. 1, for simplification of explanation, the vibration output unit 15 that outputs vibration is provided as a kind of tactile stimulus output unit.

In a case where notification information is supplied from the information receiving unit 12 to the control unit 13 while audio content is output from the audio output unit 14, that is, while a user views/listens to the audio content, the control unit 13 supplies the vibration output unit 15 with a vibration signal for outputting vibration that reports notification of the notification information from the information receiving unit 12 to the user. Thus, vibration is output (for example, the electronic device system is vibrated).

Further, the control unit 13 performs, as necessary, a process of controlling (a vibration signal corresponding to) vibration output from the vibration output unit 15 in response to audio content from the storage unit 11, or a process of controlling an audio (signal) of audio content from the storage unit 11 in response to vibration output from the vibration output unit 15.

The audio output unit 14 includes, for example, a speaker (included in earphones, headphones, wearable devices, etc.) and the like, and outputs sound corresponding to an audio signal of audio content from the control unit 13.

The vibration output unit 15 includes, for example, an eccentric motor, a linear resonant actuator (LRA), a piezoelectric element, or the like, and outputs vibration corresponding to a vibration signal from the control unit 13. In other words, the vibration output unit 15 vibrates in response to the vibration signal from the control unit 13.

Note that notification of notification information can be reported to a user by (output of) report sound such as alarm sound that reports the notification of the notification information to the user, in addition to (output of) vibration.

In a case where the notification of the notification information is reported to the user by the report sound, the control unit 13 superimposes a signal of the report sound on the audio signal of the audio content and supplies to the audio output unit 14.

Whether the notification of the notification information is reported to the user by the vibration or by the report sound can be set, for example, according to an operation of the user.

Figure 2:
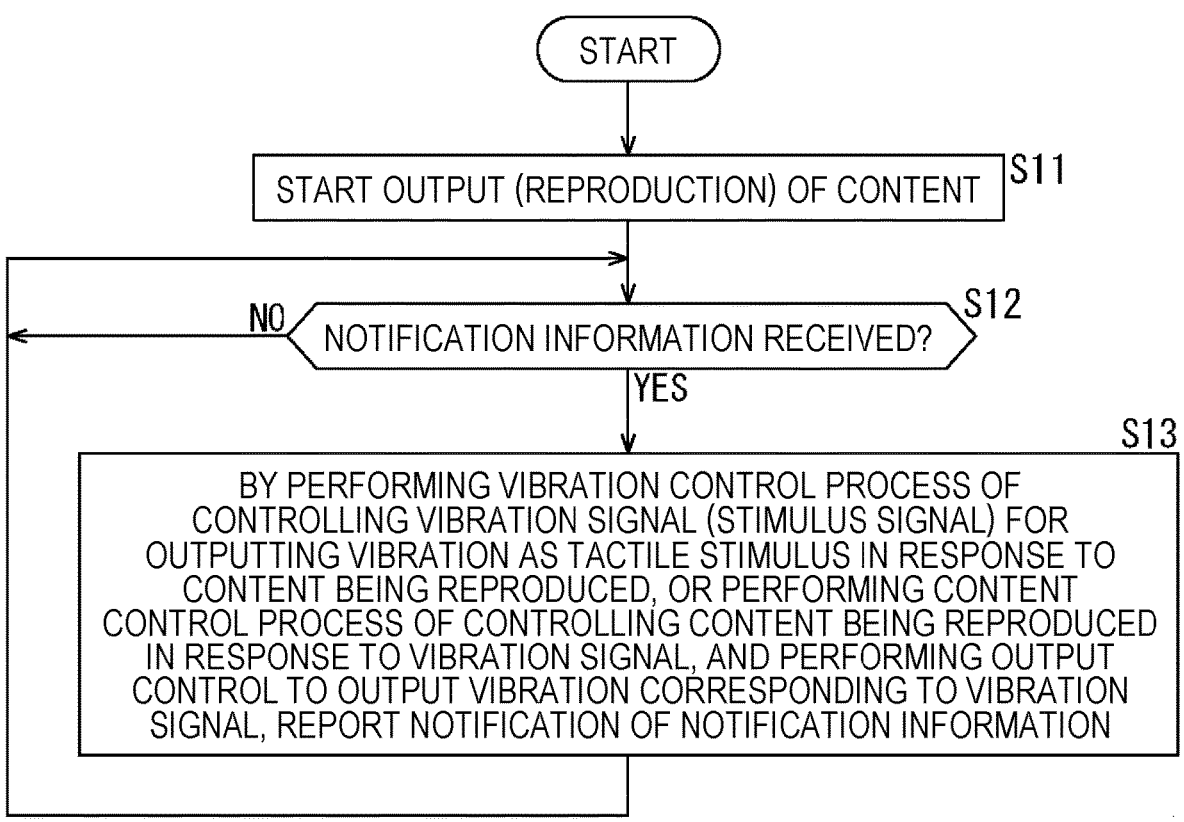
FIG. 2 is a flowchart illustrating an example of operation of the electronic device system.

FIG. 2 is a flowchart illustrating an example of operation of the electronic device system in FIG. 1.

In step S11, the storage unit 11 starts reproducing audio content in response to, for example, a user operation, and the process proceeds to step S12. An audio signal of the audio content obtained by reproducing the audio content by the storage unit 11 is supplied to the control unit 13. The control unit 13 supplies the audio signal from the storage unit 11 to the audio output unit 14 and causes the audio output unit 14 to output a corresponding sound.

In step S12, it is determined whether the information receiving unit 12 has received notification information. If it is determined in step S12 that the notification information has not been received, the process returns to S12.

Further, if it is determined in step S12 that the notification information has been received, the information receiving unit 12 supplies the notification information to the control unit 13, and the process proceeds to step S13.

In step S13, the control unit 13 reports notification of the notification information to the user in response to the notification information from the information receiving unit 12, and the process returns to step S12.

In other words, the control unit 13 performs a vibration control process that controls a stimulus signal for outputting a tactile stimulus, here, a vibration signal for outputting vibration, in response to the audio signal of the audio content being reproduced. Alternatively, the control unit 13 performs a content control process that controls the audio signal (audio signal of the audio content being reproduced) from the storage unit 11 in response to the vibration signal for outputting the vibration.

In a case where the vibration control process is performed, the control unit 13 supplies the vibration signal obtained by the vibration control process to the vibration output unit 15 and performs output control that causes the vibration output unit 15 to output corresponding vibration, so that the notification of the notification information is reported to the user.

In a case where the content control process is performed, the control unit 13 supplies the vibration signal used for the content control process to the vibration output unit 15 and performs output control that causes the vibration output unit 15 to output corresponding vibration, so that the notification of the notification information is reported to the user. Further, the control unit 13 supplies an audio signal obtained by the content control process to the audio output unit 14 instead of the audio signal itself from the storage unit 11, and causes the audio output unit 14 to output corresponding sound.

Here, the electronic device system can adopt a method for displaying notification of notification information on a display screen, a method for outputting report sound such as alarm sound, a method for outputting vibration (for example, a method for vibrating the electronic device system), and the like as a reporting method for reporting the notification of the notification information to a user.

However, in a case where a user views/listens to audio content, the user may not watch the display screen for a long time. In a case where the user does not watch the display screen for a long time, the user cannot notice notification information for a long time and cannot correspond to the notification information in the method for displaying the notification of the notification information on the display screen.

Further, according to the method for outputting the report sound, the user can immediately notice the notification information by outputting a characteristic report sound after greatly lowering volume of the audio content.

However, sudden lowering of the volume of the audio content and outputting of the report sound unrelated to the audio content while the user views/listens to the audio content may hinder the user from viewing/listening to the audio content and make the user feel uncomfortable.

Therefore, according to the method for outputting the vibration, in a case where the user views/listens to the audio content, hindrance to the user's viewing/listening to the audio content is suppressed, and the notification of the notification information can be reported to the user.

However, in a case where the user feels vibration regardless of the vibration that reports the notification of the notification information (hereinafter, also referred to as report vibration), such a in a case of moving by train, the report vibration may not be noticed.

In addition, even in a case where the user does not feel vibration regardless of the report vibration, when the user views/listens to audio content, consciousness is less likely to be directed to vibration as a tactile stimulus due to an auditory stimulus (stimulus to an auditory sense) by the audio content, and the report vibration may not be noticed.

Therefore, the control unit 13 performs a perception improvement process that improves perception of vibration (tactile stimulus), for example, the vibration control process, the content control process as described with reference to FIG. 2, or the like. Thus, while hindrance to user's viewing/listening to the audio content is suppressed, it makes it easier for the user to notice report vibration that reports notification of notification information, and the notification information can be responded promptly.

Hereinafter, the control unit 13 that performs various perception improvement processes will be described.

Note that, in the electronic device system, notification of notification information can be reported to the user by any method (including a plurality of methods) for displaying notification of notification information on a display screen, for outputting report sound such as alarm sound, or for outputting vibration. However, in the following, unless otherwise specified, the electronic device system reports the notification of the notification information to the user by the method for outputting the vibration.

First Configuration Example of Control Unit 13

Figure 3:
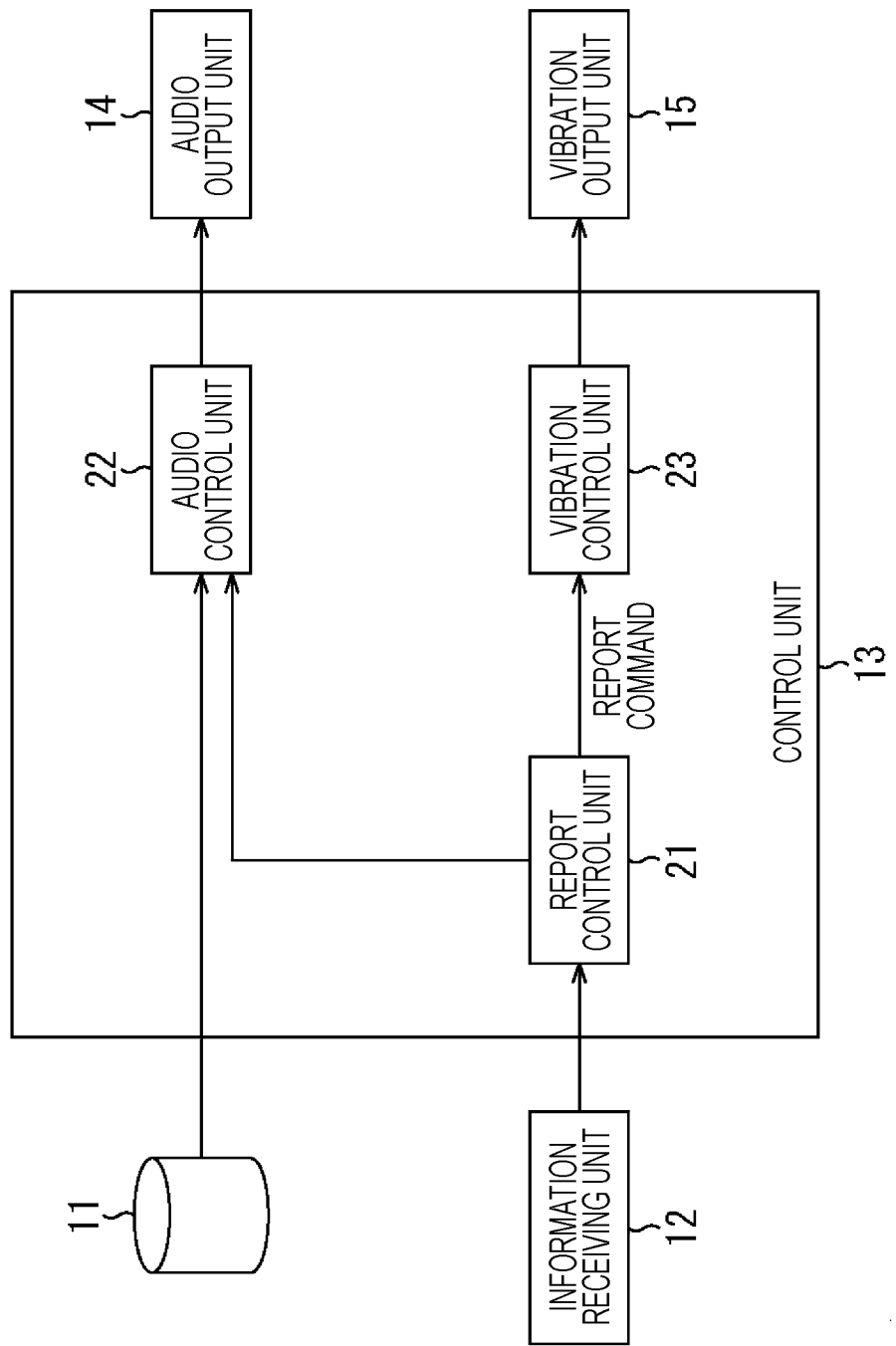
FIG. 3 is a block diagram showing a first configuration example of a control unit 13.

FIG. 3 is a block diagram showing a first configuration example of the control unit 13.

In FIG. 3, the control unit 13 includes a report control unit 21, an audio control unit 22, and a vibration control unit 23.

Notification information is supplied to the report control unit 21 from the information receiving unit 12. The report control unit 21 performs various controls for reporting notification of the notification information to a user.

In other words, when the notification information is supplied from the information receiving unit 12, the report control unit 21 controls the vibration control unit 23 by supplying the vibration control unit 23 with report command that gives a command to report the notification of the notification information or the like to the user. Further, the report control unit 21 controls the audio control unit 22 by supplying the audio control unit 22 with a command requesting that a perception improvement process be performed or the like.

Note that, in addition, the report control unit 21 determines a method of reporting (vibration, report sound, etc.), a timing of reporting, and the like, and controls the audio control unit 22 and the vibration control unit 23 in response to the determined contents.

The audio control unit 22 is supplied with an audio signal of audio content from the storage unit 11. The audio control unit 22 supplies the audio signal of the audio content from the storage unit 11 to the audio output unit 14, so that a corresponding sound is output. Further, the audio control unit 22 performs a content control process as the perception improvement process that controls the audio signal of the audio content from the storage unit 11 in response to (vibration corresponding to) a vibration signal generated by the vibration control unit 23 according to the control of the report control unit 21. Then, the audio control unit 22 supplies an audio signal obtained by (the content control process as) the perception improvement process to the audio output unit 14, so that a corresponding sound is output.

The vibration control unit 23 generates a vibration signal for outputting report vibration in response to the report command from the report control unit 21, and supplies the vibration signal to the vibration output 15. The vibration output unit 15 outputs report vibration in response to the vibration signal from the vibration control unit 23.

In the control unit 13 of FIG. 3 configured as described above, when the notification information is supplied from the information receiving unit 12 to the report control unit 21, the report control unit 21 causes the vibration control unit 23 to output the report vibration. Further, the report control unit 2 controls the audio control unit 22 so as to perform the perception improvement process.

The audio control unit 22 per forms the perception improvement process of controlling the audio signal of the audio content from the storage unit 11 according to the control of the report control unit 21, and supplies the audio signal obtained by the perception improvement process to the audio output unit 14, so that the corresponding sound is output.

The vibration control unit 23 generates the vibration signal according to the control of the report control unit 21, and supplies the vibration signal to the vibration output unit 15, so that the corresponding report vibration is output.

Figure 4:
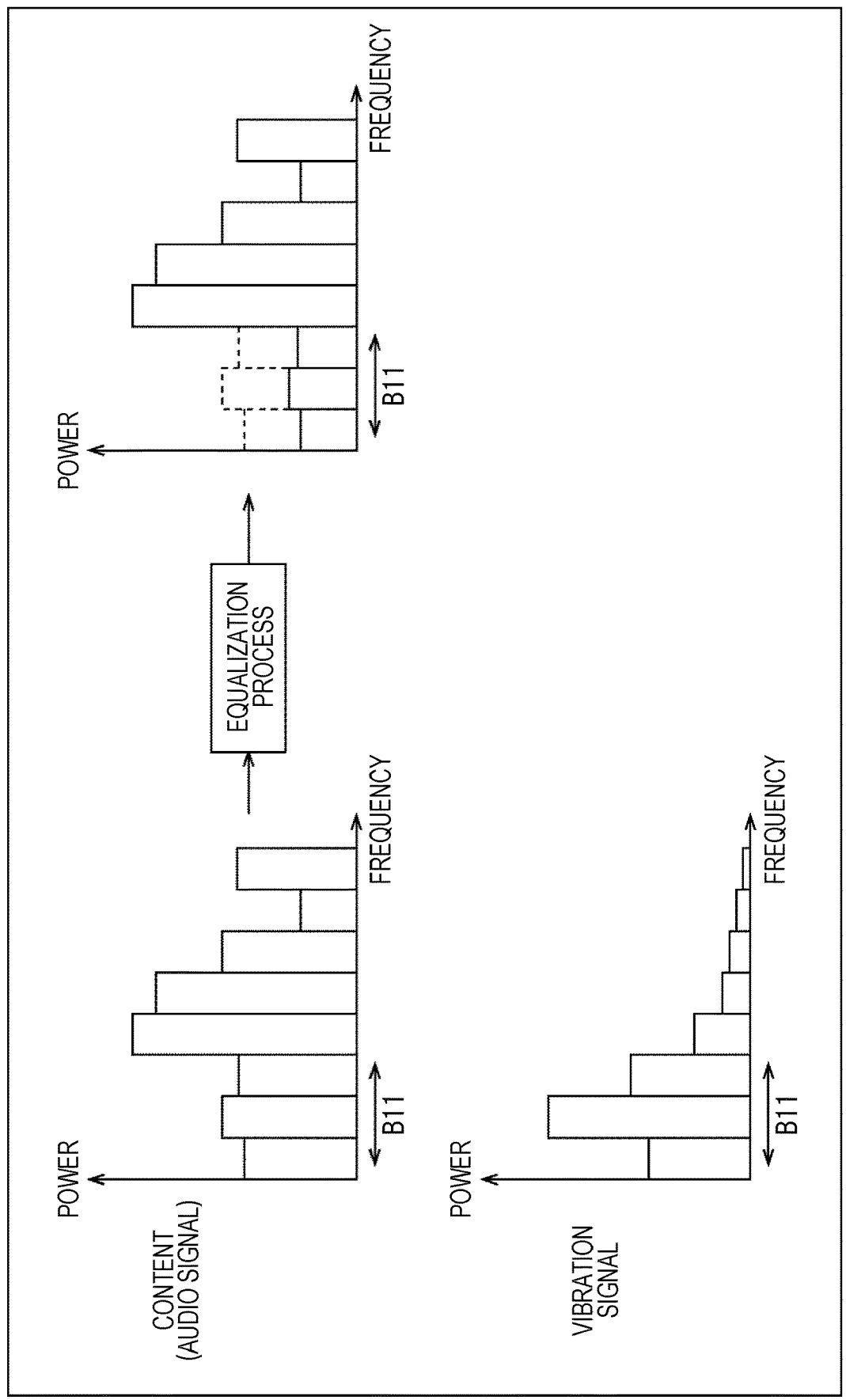
FIG. 4 is a diagram illustrating a perception improvement process performed by an audio control unit 22.

FIG. 4 is a diagram illustrating the perception improvement process performed by the audio control unit 22 of FIG. 3.

FIG. 4 shows a frequency spectrum of (the sound corresponding to) the audio signal of the audio content and a frequency spectrum of (the report vibration corresponding to) the vibration signal.

The report control unit 21 of FIG. 3 controls the audio control unit 22 so as to control the frequency spectrum of the sound of the audio content in response to the frequency spectrum of the report vibration.

Specifically, the report control unit 21 acquires the frequency spectrum of the vibration signal and detects a frequency band B11 in which power (energy) of the vibration signal is large, that is, for example, the frequency band B11 in which the power of the vibration signal is equal to or higher than a threshold value. Then, the report control unit 21 controls the audio control unit 22 so that a process of suppressing power of a frequency band B11 of the audio signal of the audio content is performed as the perception improvement process (content control process).

As shown in FIG. 4, according to the control of the report control unit 21, the audio control unit 22 performs an equalization process that suppresses the power of the frequency band B11 of the audio signal of the audio content on the audio signal of the audio content, and supplies an audio signal after the equalization process to the audio output unit 14.

Here, in a case where the frequency band in which the power of (the vibration signal corresponding to) the report vibration is large and the frequency band in which the power of the audio (signal) of the audio content is large overlap, it is presumed that user's consciousness is perceptively less likely to be directed to the report vibration by viewing/listening to the audio content.

Therefore, as described above, by suppressing the power of the frequency band B11 in which the power of the vibration signal is large among the power of the audio signal of the audio content, the power of the vibration signal is relatively larger than the power the sound of the audio content in the frequency band B11.

As a result, a fact that the user's consciousness is less likely to be directed to the report vibration by viewing/listening to the audio content is suppressed, and the user is more likely to notice the report vibration.

Note that, since only the power of the frequency band B11 in which the power of the vibration signal is large among the power of the audio signal of the audio content is suppressed here, it is possible to suppress influence on user's viewing/listening to the audio content compared with a case where volume of the audio content is greatly reduced.

In the report control unit 21, the frequency spectrum of the vibration signal can be acquired, for example, by frequency analysis of the vibration signal generated by the vibration control unit 23. Further, the frequency spectrum of the vibration signal can be obtained in advance by, for example, prior analysis. Further, the frequency spectrum of the vibration signal can be approximated by, for example, a mountain-shaped spectrum centered on a resonance frequency of the vibration output unit 15.

Second Configuration Example of Control Unit 13

Figure 5:
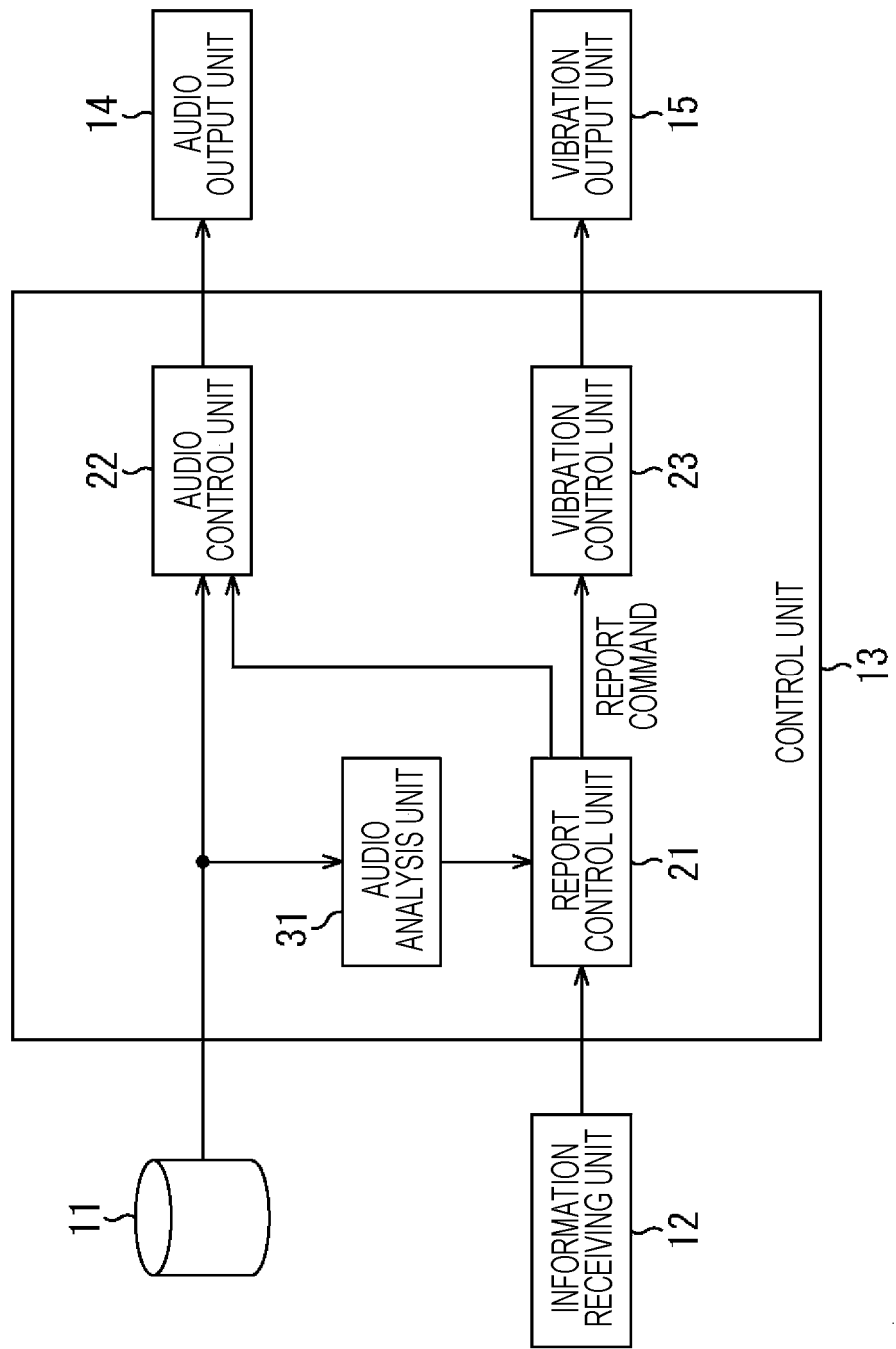
FIG. 5 is a block diagram showing a second configuration example of the control unit 13.

FIG. 5 is a block diagram showing a second configuration example of the control unit 13.

Note that, in the drawings, parts corresponding to those in FIG. 3 are designated by the same reference numerals, and description thereof will be omitted as appropriate.

In FIG. 5, the control unit 13 includes the report control unit 21, the audio control unit 22, the vibration control unit 23, and an audio analysis unit 31.

Therefore, the control unit 13 of FIG. 5 is common to a case of FIG. 3 in that it includes the report control unit 21, the audio control unit 22, and the vibration control unit 23. However, the control unit 13 of FIG. 5 is different from the case of FIG. 3 in that the audio analysis unit 31 is newly provided.

The audio analysis unit 31 is supplied with an audio signal of audio content reproduced by the storage unit 11. The audio analysis unit 31 extracts a predetermined feature amount such as a frequency spectrum from the audio signal by analyzing the audio signal from the storage unit 11 and supplies it to the report control unit 21. For example, the audio analysis unit 31 can obtain the frequency spectrum or the like of the audio signal by performing frequency analysis of the audio signal from the storage unit 11 and supply it to the report control unit 21.

In FIG. 5, the report control unit 21 performs a process similar to the case of FIG. 3, and also controls the audio control unit 22 in response to the frequency spectrum of the audio signal from the audio analysis unit 31.

In other words, in a case where power of a frequency band B11 in which power of vibration signal is large among power of the frequency spectrum of the audio signal is large, that is, in a case where the power of the frequency band B11 of the audio signal is equal to or more than a threshold value, the report control unit 21 controls the audio control unit 22 so as to perform the equalization process that suppresses the power of the frequency band B11 of the audio signal of the audio content, as described in FIG. 4.

On the other hand, in a case where the power of the frequency band B11 in which the power of the vibration signal is large among the power of the frequency spectrum of the audio signal is not large, that is, in a case where the power of the frequency band B11 of the audio signal is not equal to or more than the threshold value, the report control unit 21 omits (does not perform) controlling of the audio control unit 22 so as to perform the equalization process.

This is because in a case where the power of the frequency band B11 of the audio signal is not large, the user's consciousness tends to be directed to the report vibration in which the power of the frequency band B11 is large even without suppressing the power of the audio signal of the frequency band B11.

Third Configuration Example of Control Unit 13

Figure 6:
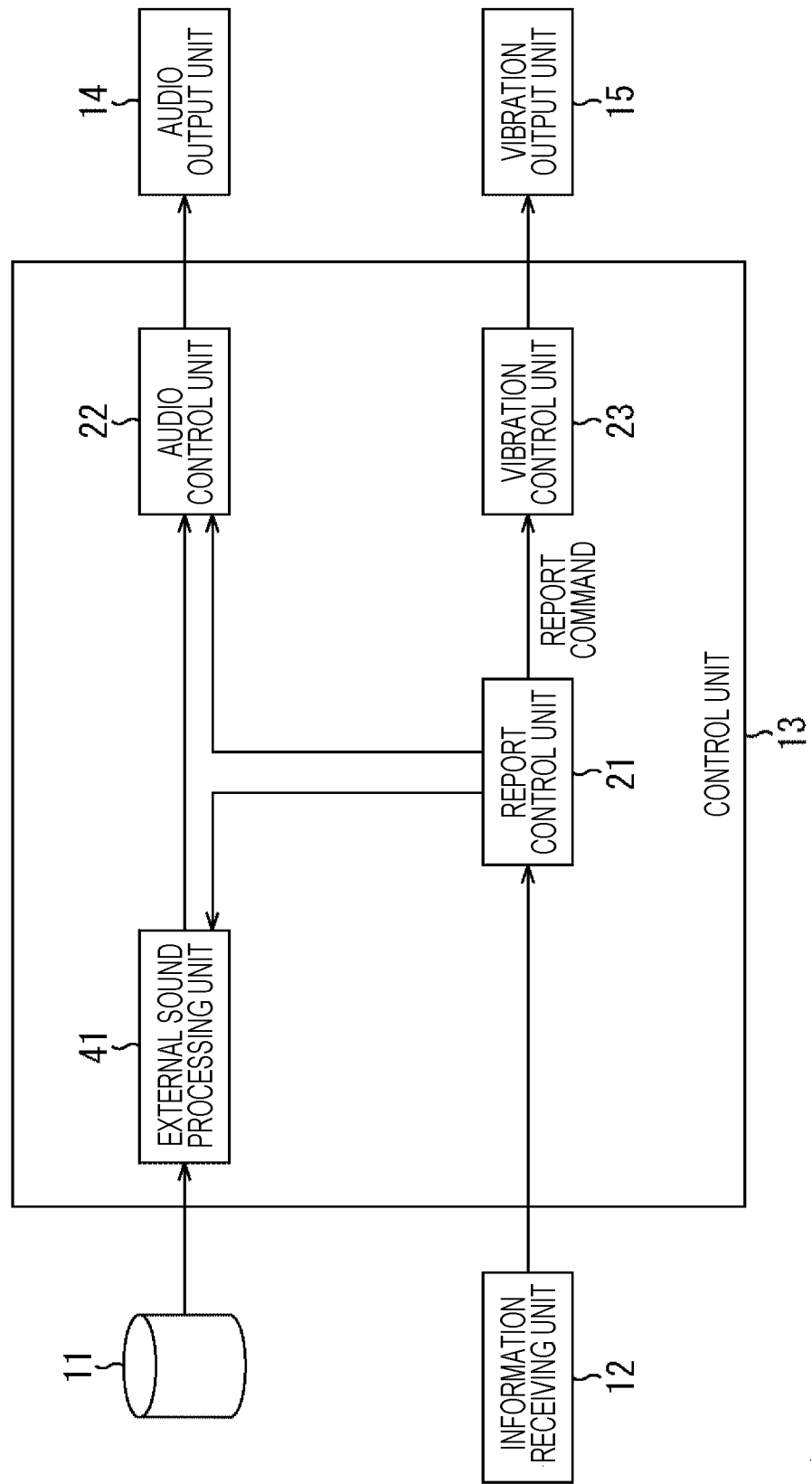
FIG. 6 is a block diagram showing a third configuration example of the control unit 13.

FIG. 6 is a block diagram showing a third configuration example of the control unit 13.

Note that, in the drawings, parts corresponding to those in FIG. 3 are designated by the same reference numerals, and description thereof will be omitted as appropriate.

In FIG. 6, the control unit 13 includes the report control unit 21, the audio control unit 22, the vibration control unit 23, and an external sound processing unit 41.

Therefore, the control unit 13 of FIG. 6 is common to the case of FIG. 3 in that it includes the report control unit 21, the audio control unit 22, and the vibration control unit 23. However, the control unit 13 of FIG. 6 is different from the case of FIG. 3 in that the external sound processing unit 41 is newly provided.

The external sound processing unit 41 is supplied with an audio signal of audio content reproduced by the storage unit 11. The external sound processing unit 41 performs an external sound process on the audio signal of the audio content from the storage unit 11 as necessary, and supplies an audio signal after the external sound process or the audio signal of the audio content from the storage unit 11 to the audio control unit 22.

Here, the external sound process includes a process of realizing an external sound capture function that captures ambient sound into sound output from the audio output unit 14 and a noise cancel function that cancels the ambient sound from the sound output from the audio output unit 14. Therefore, according to the external sound capture function, when a user views/listens to the audio content, it becomes easy to hear the ambient sound. On the other hand, according to the noise cancel function, when the user views/listens to the audio content, it becomes difficult to hear the ambient sound, that is, noise. It can be said that contradictory processes in a sense, that is, a process of superimposing ambient sound and a process of removing the ambient sound, are performed in the external sound capture function and the noise cancel function. Therefore, the external sound capture function and the noise cancel function cannot be turned on at the same time.

The control unit 13 can turn on/off the external sound capture function and the noise cancel function, and when report vibration is output from the vibration output unit 15, the report control unit 21 controls on/off of the external sound capture function and the noise cancel function by controlling the external sound processing unit 41.

The external sound processing unit 41 measures the ambient sound and performs the external sound process on the audio signal of the audio content from the storage unit 11 using a signal of the ambient sound (hereinafter, also referred to as an ambient sound signal) obtained by the measurement.

In other words, in a case where the external sound capture function is turned on, the external sound processing unit 41 performs a process of superimposing the ambient sound signal on the audio signal of the audio content from the storage unit 11 as the external sound process. Further, in a case where the noise cancel function is turned on, the external sound processing unit 41 performs a process of superimposing a signal of an opposite phase of the ambient sound signal on the audio signal of the audio content from the storage unit 11 as the external sound process.

The external sound capture function and the noise cancel function can be turned on/off by a user's operation, control of the external sound processing unit 41 by the report control unit 21, and the like.

In the control unit 13 configured as described above, when the information receiving unit 12 receives notification information and supplies it to the report control unit 21, the report control unit 21 controls the audio control unit 22 and the vibration control unit 23, in a manner similar to the case of FIG. 3.

Further, the report control unit 21 detects current ON/OFF states of the external sound capture function and the noise cancel function and controls on/off of the external sound capture function and the noise cancel function by controlling the external sound processing unit 41 in response to a result of the detection.

In other words, the report control unit 21 controls the external sound processing unit 41 so that an external sound process that conflicts with the external sound process currently performed is performed as much as possible.

Specifically, in a case where the external sound capture function is turned on and the noise cancel function is turned off, the report control unit 21 controls the external sound processing unit 41 so as to turn off the external sound capture function or to turn off the external sound capture function and turn on the noise cancel function. In this case, a state of hearing sound output from the audio output unit 14 changes from a state in which it is easy to hear an ambient sound to a state in which it is difficult to hear it.

In a case where the noise cancel function is turned on and the external sound capture function is turned off, the report control unit 21 controls the external sound processing unit 41 so as to turn off the noise cancel function or to turn off the noise cancel function and turn on the external sound capture function. In this case, the state of nearing the sound output from the audio output unit 14 changes from the state in which it is difficult to hear the ambient sound to the state in which it is easy to hear it.

In a case where the external sound capture function and the noise cancel function are turned off, the report control unit 21 controls the external sound processing unit 41 so as to turn on the external sound capture function or to turn on the noise cancel function. In this case, the state of hearing the sound output from the audio output unit 14 changes from a state in which it is neither easy to hear nor difficult to hear the ambient sound to the state in which it is easy to hear it or to the state in which it is difficult to hear it.

As described above, the state of hearing the ambient sound changes with respect to the sound output from the audio output unit 14, so that a user is more conscious of a tactile stimulus and more easily notices report vibration.

Fourth Configuration Example of Control Unit 13

Figure 7:
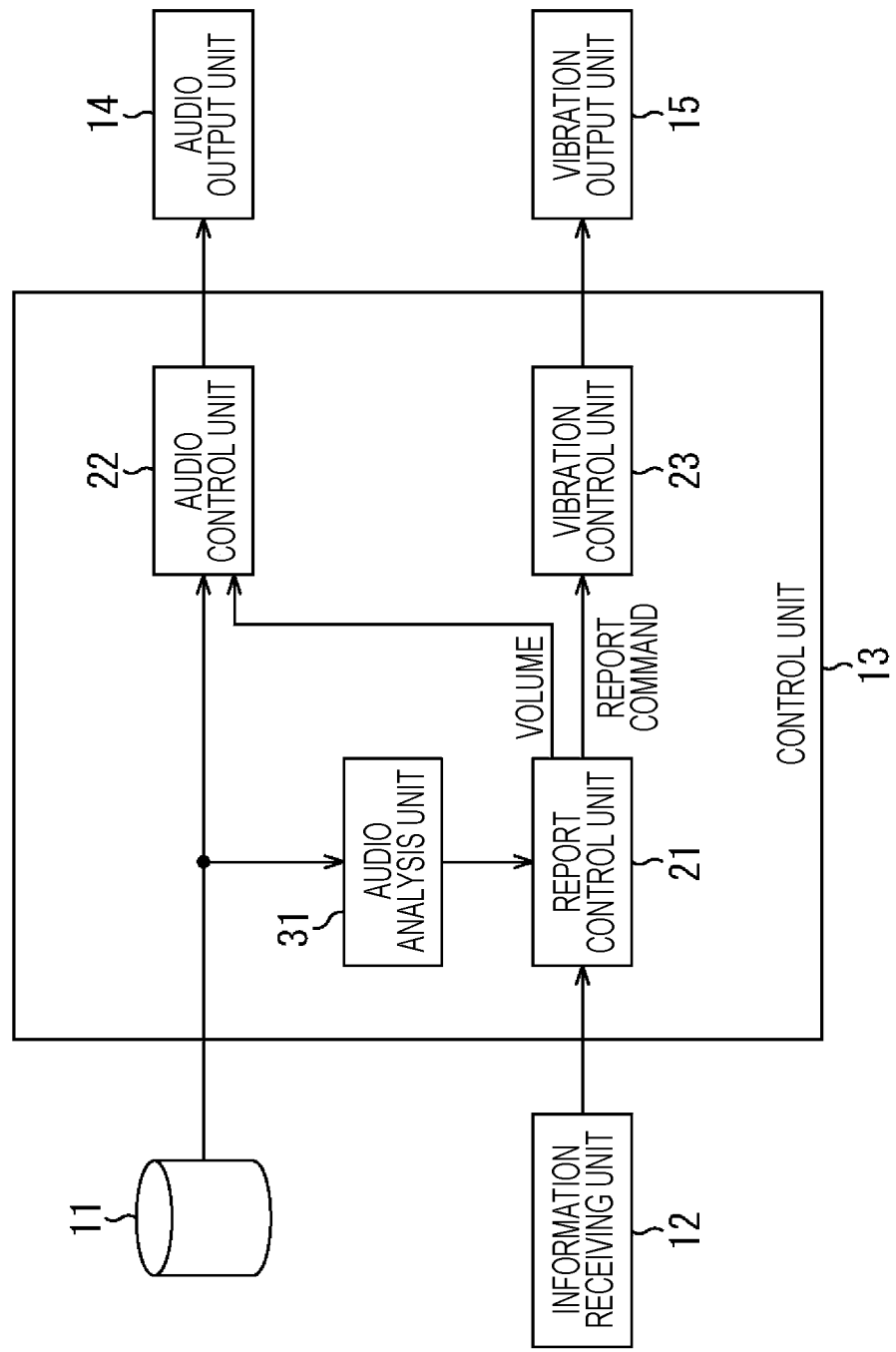
FIG. 7 is a block diagram showing a fourth configuration example of the control unit 13.

FIG. 7 is a block diagram showing a fourth configuration example of the control unit 13.

Note that, in the drawings, parts corresponding to those in FIG. 5 are designated by the same reference numerals, and description thereof will be omitted as appropriate.

In FIG. 7, the control unit 13 includes the report control unit 21, the audio control unit 22, the vibration control unit 23, and the audio analysis unit 31.

Therefore, the control unit 13 of FIG. 7 is configured similarly to the case of FIG. 5.

However, in the control unit 13 of FIG. 7, the perception improvement process is performed not by the audio control unit 22 but by the vibration control unit 23.

In other words, when the notification information is supplied from the information receiving unit 12, the report control unit 21 controls the vibration control unit 23 by supplying the vibration control unit 23 with report command that gives a command to report the notification of the notification information or the like to the user. Further, the report control unit 21 controls the vibration control unit 23 by supplying the vibration control unit 23 with a command requesting that the perception improvement process be performed or the like in response to a feature amount of an audio signal of audio content supplied from the audio analysis unit 31.

The vibration control unit 23 performs a vibration control process as the perception improvement process that controls a vibration signal in response to the audio (signal) of the audio content reproduced in the storage unit 11 according to the control of the report control unit 21. Then, the vibration control unit 23 supplies a vibration signal obtained by (the vibration control process as) the perception improvement process to the vibration output unit 15, so that corresponding report vibration is output.

In the control unit 13 of FIG. 7 configured as described above, the audio signal of the audio content reproduced by the storage unit 11 is supplied to the audio control unit 22 and the audio analysis unit 31. The audio control unit 22 supplies the audio signal from the storage unit 11 to the audio output unit 14 and causes the audio output unit 14 to output a corresponding sound at volume according to the control of the report control unit 21, for example.

Further, the audio analysis unit 31 analyzes the audio signal from the storage unit 11, obtains an acoustic or musical feature amount such as a frequency spectrum or a heat cycle of the audio signal, and supplies it to the report control unit 21.

Then, when the notification information is supplied from the information receiving unit 12 to the report control unit 21, the report control unit 21 controls the vibration control unit 23 so as to perform the perception improvement process in response to the feature amount of the audio signal from the audio analysis unit 31.

The vibration control unit 23 performs the perception improvement process according to the control of the report control unit 21, and supplies the vibration signal obtained by the perception improvement process to the vibration output unit 15, so that the corresponding report vibration is output.

Here, as the perception improvement process, the report control unit 21 can control the vibration control unit 23 so as to control a frequency spectrum of (the vibration signal for outputting) the report vibration in response to, for example, the frequency spectrum as the feature amount of the audio signal of the audio content.

Further, as the perception improvement process, the report control unit 21 can control the vibration control unit 23 so as to control output timing of the report vibration in response to, for example, the beat cycle as the feature amount of the audio signal of the audio content.

Further, as the perception improvement process, the report control unit 21 can control the vibration control unit 23 so as to control intensity of the report vibration in response to the volume of the sound of the audio content.

Figure 8:
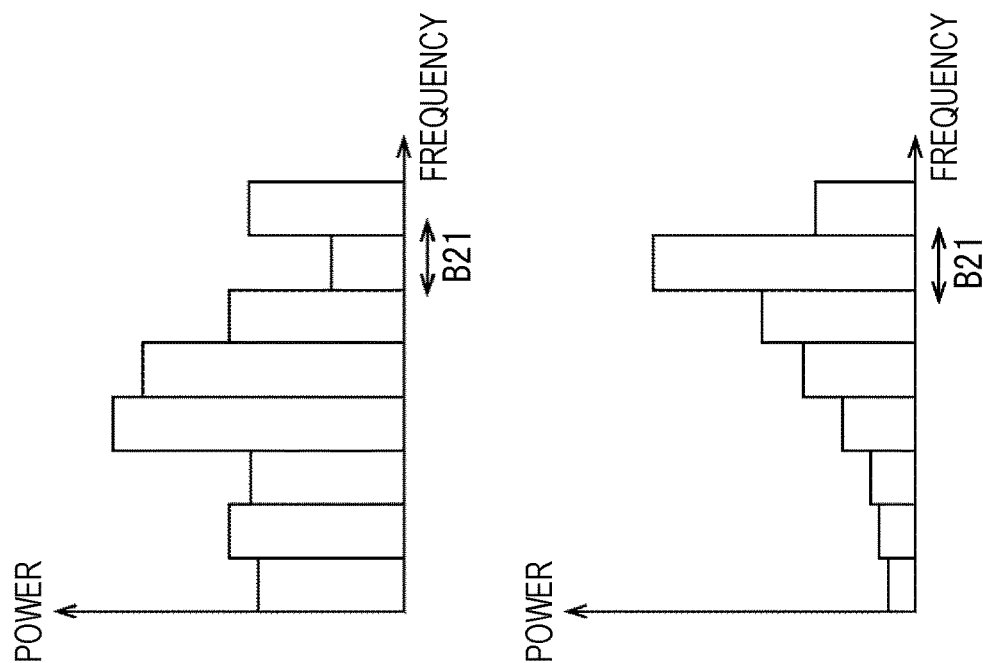
FIG. 8 is a diagram illustrating a first example of a perception improvement process performed by a vibration control unit 23.

FIG. 8 is a diagram illustrating a first example of the perception improvement process performed by the vibration control unit 23 of FIG. 7.

FIG. 8 shows the frequency spectrum of (the sound corresponding to) the audio signal of the audio content and the frequency spectrum of (the report vibration corresponding to) the vibration signal.

In the first example of the perception improvement process, the report control unit 21 of FIG. 7 controls the vibration control unit 23 so as to control the frequency spectrum of (the report vibration corresponding to) the vibration signal in response to the frequency spectrum of (the sound corresponding to) the audio signal of the audio content.

Specifically, the report control unit 21 detects a frequency band B21 in which power of the audio signal is small within a frequency range that can be taken as a frequency component of the report vibration (vibration signal) from the frequency spectrum of the audio signal of the audio content. As the frequency band B21 in which the power of the audio signal is small, for example, a frequency band in which the power of the audio signal is a minimum, a frequency band in which the power is equal to or less than a threshold value, or the like can be adopted within the frequent range that can be taken as the frequency component of the report vibration.

After that, the report control unit 21 controls the vibration control unit 23 so as to perform a process of generating a vibration signal of a frequency spectrum in which the power of the frequency band B21 becomes a maximum (frequency peak) as the perception improvement process (vibration control process).

As shown in FIG. 8, the vibration control unit 23 generates the vibration signal of the frequency spectrum in which the power of the frequency band B21 becomes the maximum and supplies it to the vibration output unit 15 according to the control of the report control unit 21.

According the first example of the perception improvement process, since the vibration signal having the large power in the frequency band in which the power of the audio signal is small is generated, a user can easily notice the report vibration corresponding to the vibration signal. Further, since the audio content is not processed in the first example of the perception improvement process, a user viewing/listening to the audio content can be prevented from feeling a sense of discomfort in the audio content.

Figure 9:
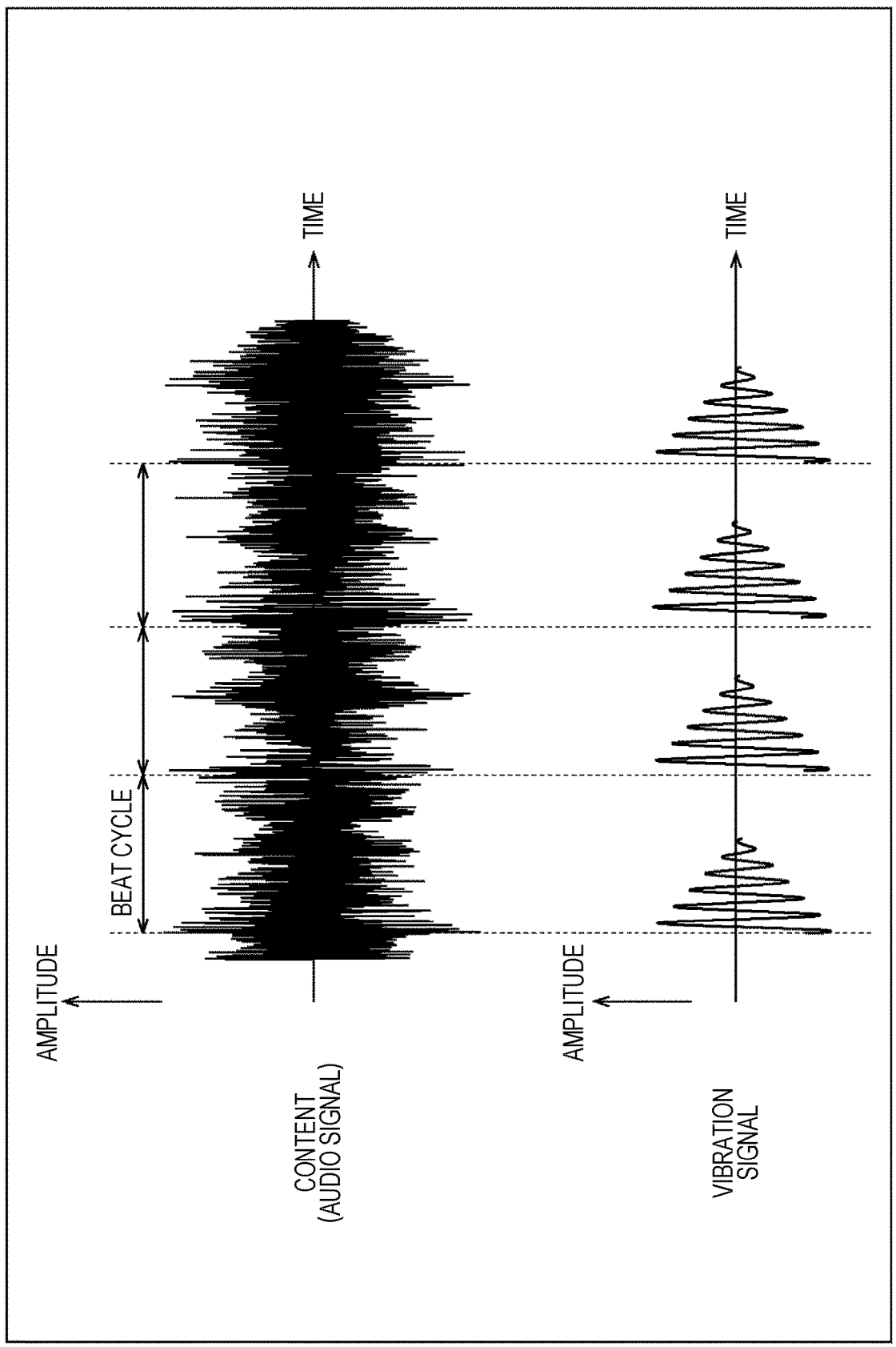
FIG. 9 is a diagram illustrating a second example of the perception improvement process performed by the vibration control unit 23.

FIG. 9 is a diagram illustrating a second example of the perception improvement process performed by the vibration control unit 23 of FIG. 7.

FIG. 9 shows a (time-varying) waveform of the audio signal of the audio content and a waveform of the vibration signal.

In the second example of the perception improvement process, the report control unit 21 of FIG. 7 controls the vibration control unit 23 so as to control the output timing of (the report vibration corresponding to) the vibration signal in response to the beat cycle of the audio signal of the audio content.

Specifically, the report control unit 21 controls the vibration control unit 23 so as to perform a process of generating a vibration signal in which a waveform rises in synchronization with a beat of the audio signal of the audio content as the perception improvement process (vibration control process).

As shown in FIG. 9, the vibration control unit 23 generates a vibration signal in which a waveform rises at the beginning of the beat cycle of the audio signal of the audio content and supplies it to the vibration output unit 15 according to the control of the report control unit 21.

Note that in the second example of the perception improvement process, in addition to generating the vibration signal in which the waveform rises at the beginning of the beat cycle of the audio signal of the audio content, a vibration signal interlocked with the beat of the audio signal of the audio content in any form can be generated. For example, it is possible to generate a vibration signal in which a waveform rises at a position deviated by a predetermined time from the begging of the beat cycle of the audio signal of the audio content, a vibration signal which a waveform rises at timing of an upbeat of the audio signal of the audio content, and the like.

According to the second example of the perception improvement process, the beat of the audio content and the beat of the report vibration are interlocked, so that a user can easily notice the report vibration. Further, similarly to the first example, the audio content is not processed in the second example of the perception improvement process, so that a user viewing/listening to the audio content can be prevented from feeling a sense of discomfort in the audio content.

Here, the beat cycle of the audio signal of the audio content can be obtained by (acoustic) analysis using a temporal change of the audio signal, a structure of the frequency spectrum, and the like. In addition, the beat cycle of the audio signal of the audio content can be obtained by using, for example, prior information of music (for example, a time signature of a musical score and the like) as the audio content.

Note that, as the additional perception improvement process, the report control unit 21 can control the vibration control unit 23 so as to control the intensity of the report vibration in response to the volume of the sound of the audio content.

For example, the report control unit 21 can control the vibration control unit 23 so that the higher the volume of the sound of the audio content, the higher the intensity (magnitude) of the report vibration, in response to signal intensity (amplitude or power) of the audio signal of the audio content reproduced in the storage unit 11 and a volume state for adjusting the volume.

In this case, if the volume of the sound of the audio content reproduced at the time of reporting notification of notification information is high, high-intensity report vibration is output, and if the volume is low, low-intensity report vibration is output, so that a user can easily notice the report vibration.

Furthermore, it is possible to output the report vibration with intensity necessary and sufficient for the volume of the sound of the audio content, and it is possible to suppress hindrance to user's music experience caused by output of report vibration with intensity exceeding necessary intensity, an increase in power consumption, and the like.

Fifth Configuration Example of Control Unit 13

Figure 10:
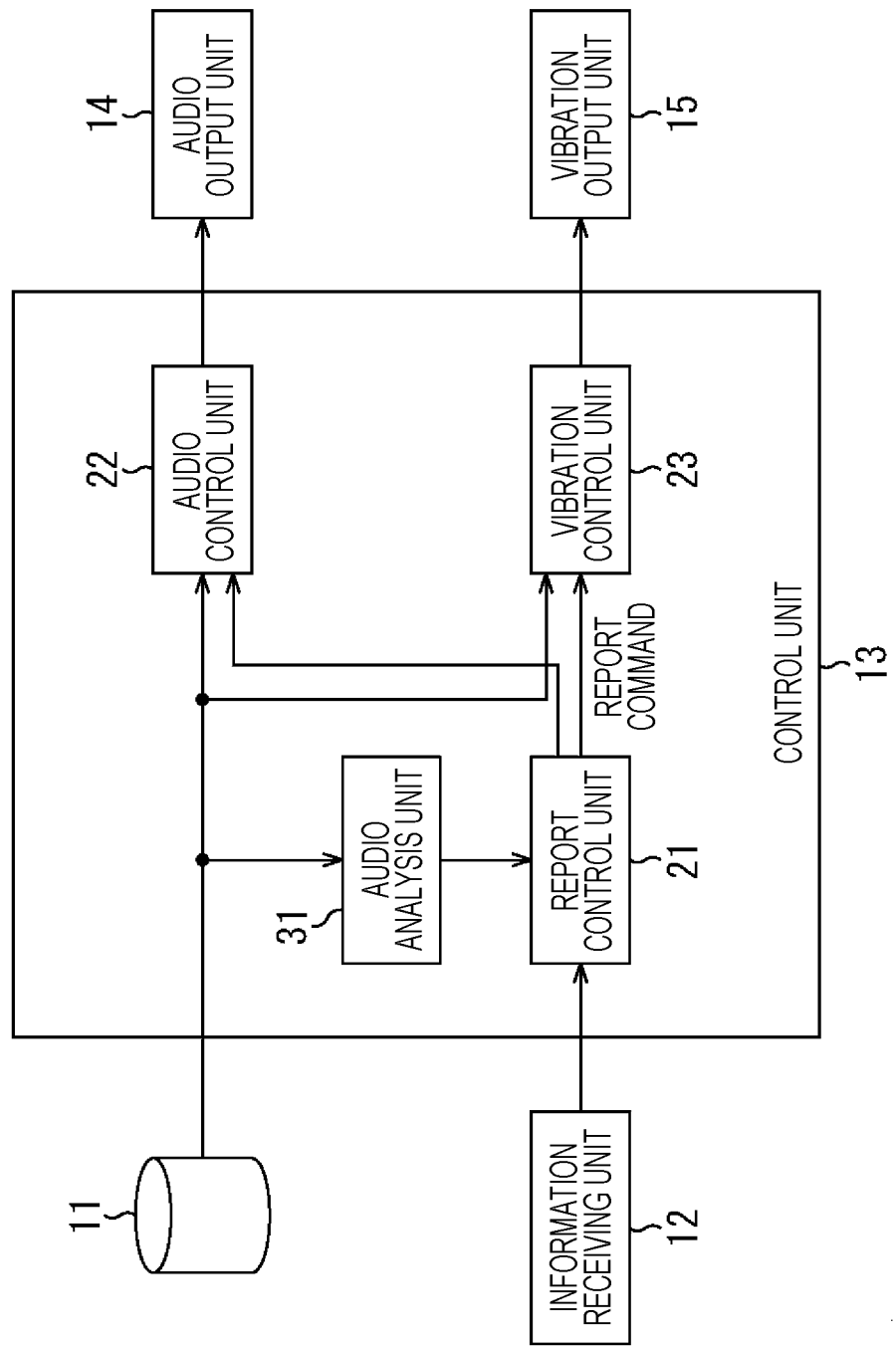
FIG. 10 is a block diagram showing a fifth configuration example of the control unit 13.

FIG. 10 is a block diagram showing a fifth configuration example of the control unit 13.

Note that, in the drawings, parts corresponding to those in FIG. 5 or FIG. 7 are designated by the same reference numerals, and description thereof will be omitted as appropriate.

In FIG. 10, the control unit 13 includes the report control unit 21, the audio control unit 22, the vibration control unit 23, and the audio analysis unit 31.

Therefore, the control unit 13 of FIG. 10 is configured similarly to the case of FIG. 5 or FIG. 7.

However, in the control unit 13 of FIG. 10, a signal obtained by reproducing audio content in the storage unit 11 is supplied to the vibration control unit 23 in addition to the audio control unit 22 and the audio analysis unit 31.

The control unit 13 of FIG. 10 has a sound interlocking vibration function. The sound interlocking vibration function is a function in which vibration is output interlocking with sound of audio content. The vibration output interlocking with the sound of the audio content is also called interlocking vibration. According to the sound interlocking vibration function, it is possible to increase a sense of immersion and power in the audio content. The sound interlocking vibration function can be turned on/off in response to, for example, a user operation or the like.

In FIG. 10, in addition to generating a vibration signal for outputting report vibration, the vibration control unit 23 generates a vibration signal for outputting interlocking vibration interlocked with an audio signal of the audio content and supplies it to the vibration output unit 15. Therefore, the vibration output unit 15 of FIG. 10 outputs the interlocking vibration in addition to the report vibration.

Note that, in the vibration control unit 23, the vibration signal for outputting the interlocking vibration can be generated by using an audio signal obtained by reproducing the audio content in the storage unit 11. Further, in a case where the audio content includes generation information for generating the interlocking vibration, the vibration signal for outputting the interlocking vibration can be generated in the vibration control unit 23 by using generation information included in a signal obtained by reproducing the audio content in the storage unit 11.

In a case where the sound interlocking vibration function is turned on and the sound of the audio content and the interlocking vibration are output, even if the report vibration is output, a user may be distracted by the interlocking vibration and hardly notice the report vibration.

Therefore, in the case where the sound interlocking vibration function is turned on, when the report vibration is output, the report control unit 21 can control the vibration control unit 23 so as to control the output of the interlocking vibration.

In other words, for example, the report control unit 21 can control the vibration control unit 23 so as to suspend the output of the interlocking vibration only while the report vibration is output. Alternative for example, the report control unit 21 can control the vibration control unit 23 so as to lower an interlocking property of the interlocking vibration with respect to the sound of the audio content (for example, so as to vibrate at timing deviated from original vibration timing) only while the report vibration is output.

As described above, the output of the interlocking vibration is stopped, or the interlocking property of the interlocking vibration is lowered, so that the user can easily notice the report vibration.

Note that, in the case where the sound interlocking vibration function is turned on, in addition to outputting the report vibration separately from the interlocking vibration, the interlocking vibration with the interlocking property lowered with respect to the sound of the audio content can be used as the report vibration.

Sixth Configuration Example of Control Unit 13

Figure 11:
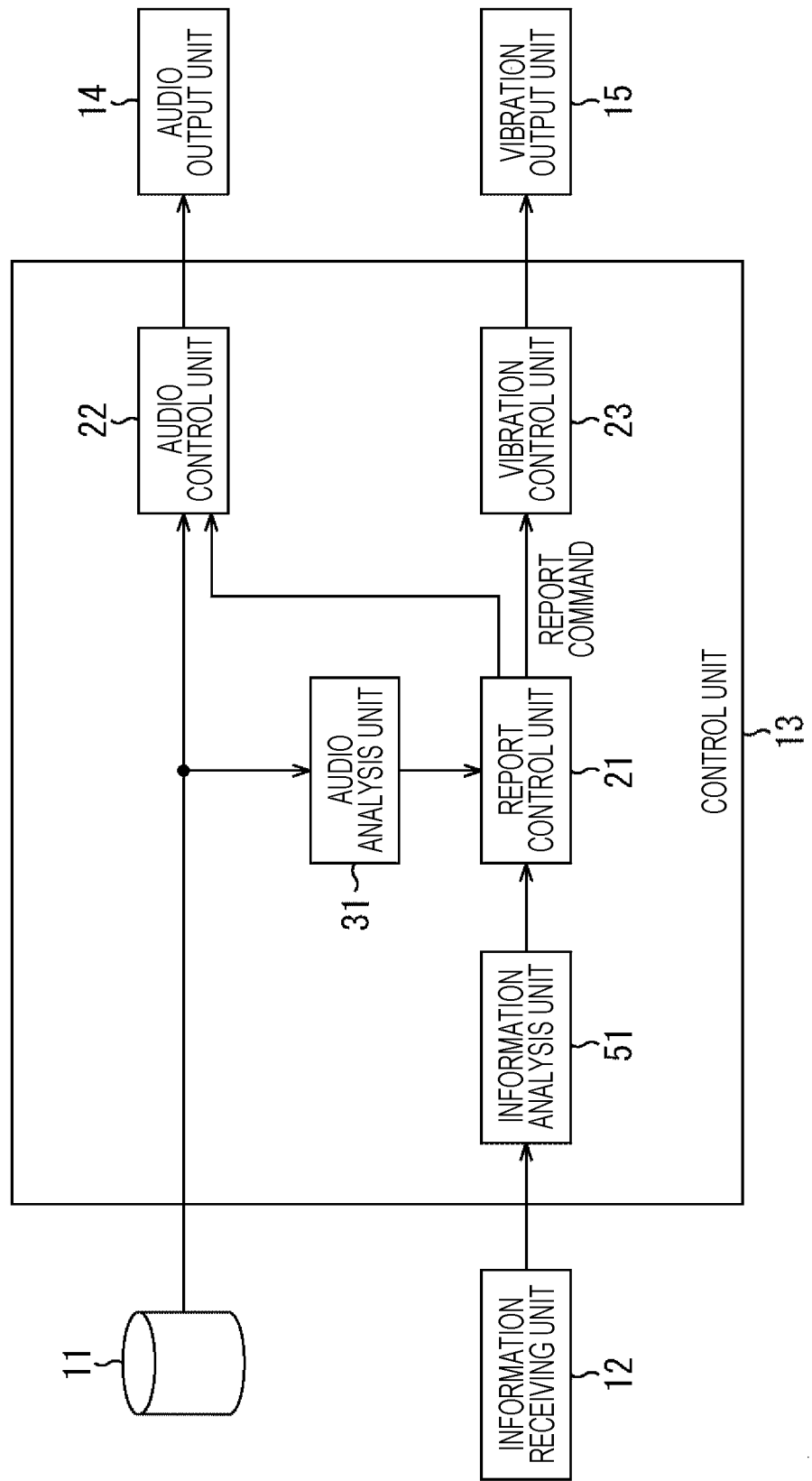
FIG. 11 is a block diagram showing a sixth configuration example of the control unit 13.

FIG. 11 is a block diagram showing a sixth configuration example of the control unit 13.

Note that, in the drawings, parts corresponding to those in FIG. 5 or FIG. 7 are designated by the same reference numerals, and description thereof will be omitted as appropriate.

In FIG. 11, the control unit 13 includes the report control unit 21, the audio control unit 22, the vibration control unit 23, the audio analysis unit 31, and an information analysis unit 51.

Therefore, the control unit 13 of FIG. 11 is configured similarly to the case of FIG. 5 or FIG. 7 in that it includes the report control unit 21, the audio control unit 22, the vibration control unit 23, and the audio analysis unit 31. However, the control unit 13 of FIG. 11 is different from the case of FIG. 5 or 7 in that the information analysis unit 51 is newly provided.

Notification information is supplied to the information analysis unit 51 from the information receiving unit 12. The information analysis unit 51 analyzes the notification information from the information receiving unit 12 and determines urgency of the notification information. For example, in a case where the notification information is information in which immediate response by a user is desirable, such as a message indicating that a call is being received or an alert providing notification of a sudden change in weather, it is determined that the urgency is high. Further, for example, in a case where the notification information is information in which necessity for immediate response by a user is low, such as an e-mail reception or a message providing notification of a battery residual quantity, it is determined that the urgency is low. A method for determining the urgency of the notification information is not particularly limited.

When the information analysis unit 51 determines urgency of the notification information, the information analysis unit 51 supplies a determination result of the urgency to the report control unit 21.

The report control unit 21 controls output timing of report sound or report vibration in response to the determination result of the urgency of the notification information from the information analysis unit 51.

In other words, in a case where the urgency of the notification information is high, the report control unit 21 controls the audio control unit 22 or the vibration control unit 23 so as to immediately perform a perception improvement process in response to the determination result that the urgency of the notification information is high, and report vibration is output. Therefore, since the report vibration is immediately output for the notification information with the high urgency, the user can immediately notice the report vibration and quickly respond to the notification information with the high urgency.

On the other hand, in a case where the urgency of the notification information is low (not high), the report control unit 21 detects a specific (reproduction) section of sound of audio content reproduced by the storage unit 11 as a report section for reporting notification of the notification information in response to the determination result that the urgency of the notification information is low. In the report control unit 21, the detection of the report section can be performed in response to an analysis result of an audio signal of the audio content by the audio analysis unit 31.

In the detection of the report section, a section that does not hinder the user from viewing/listening to music content as much as possible due to reporting by the report sound or the report vibration can be detected as the report section. In other words, for example, a quiet section of sound of the audio content, a predetermined time section starting from the end of a chorus of a song as the audio content, a song interval from the end of a song to the start of a next song as the audio content, etc. can be detected as the report section. In the detection of the report section, for example, by using power of each fixed section of an audio signal of the audio content, a group of continuous fixed sections having power equal to or less than a threshold value can be detected as the report section. Further, in the detection of the report section, for example, the report section can be detected by using a chorus or interlude section specified by performing a musical information process of the audio content.

The report control unit 21 controls the audio control unit 22 or the vibration control unit 23 so as to output report sound or report vibration in the report section. The audio control unit 22 or the vibration control unit 23 supplies a report sound signal or a vibration signal to the audio output unit 14 or the vibration output unit 15 in the report section according to the control of the report control unit 21. With this arrangement, the report sound or the report vibration is output in (timing of) the report section.

Note that, in the output of the report vibration in a case where urgency of the notification information is low, the perception improvement process may or may not be performed.

As described above, in a case where the urgency of the notification information is low, the report section such as between songs is detected, and the report sound or the report vibration is output in the report section. Therefore, for example, it is possible to prevent user's music experience from being significantly impaired by outputting the report sound or the report vibration when a chorus of a song is output as the audio content It should be noted that the output of the report sound or the report vibration in the report section such as between songs does not significantly impair the user's music experience.

Figure 12:
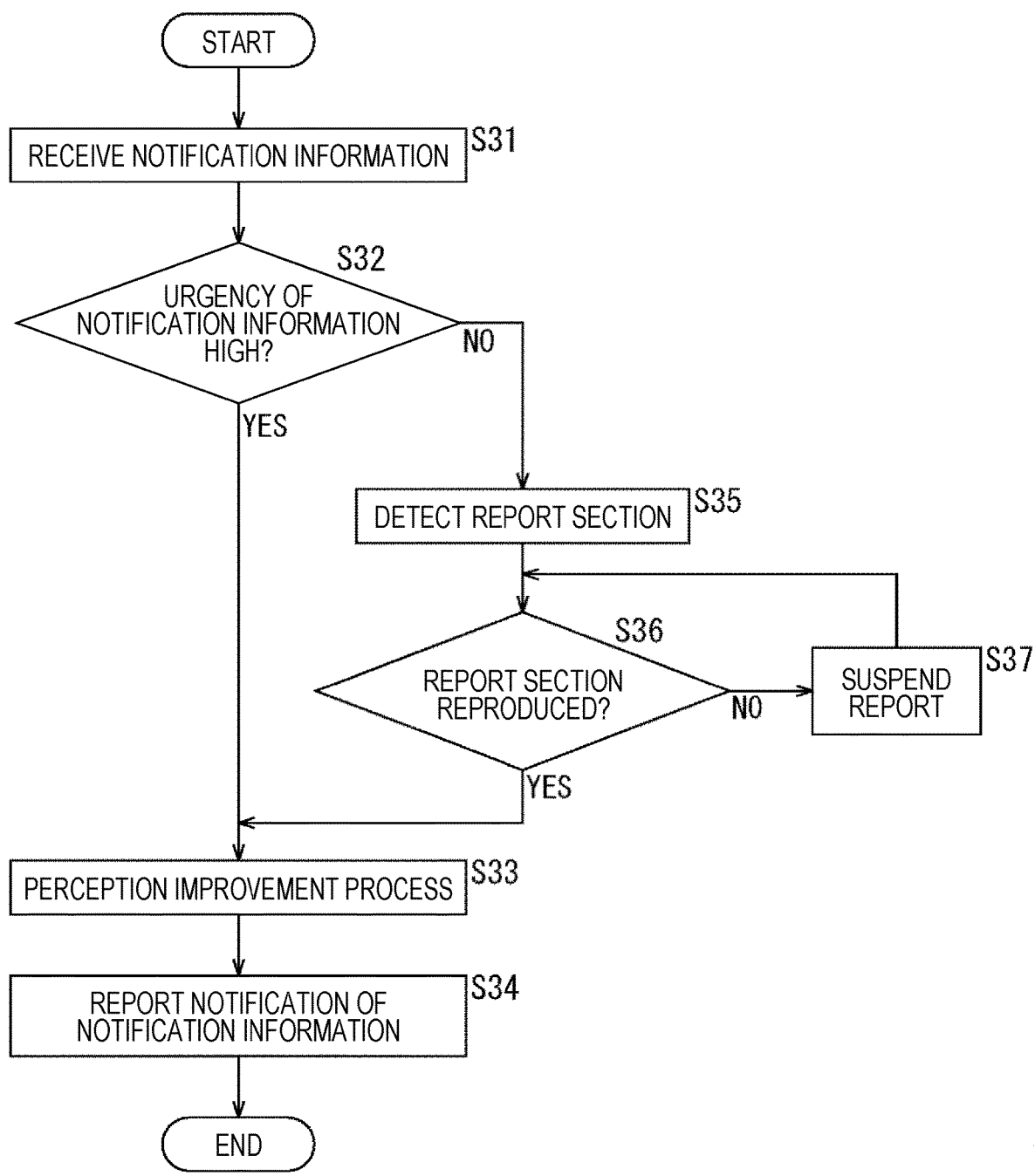
FIG. 12 is a flowchart illustrating an example of processing of the electronic device system in a case where output timing of report vibration is controlled in response to urgency of notification information.

FIG. 12 is a flowchart illustrating an example of processing of the electronic device system including the control unit 13 of FIG. 11 and in a case where output timing of report vibration is controlled in response to urgency of notification information.

Note that audio content is reproduced in the storage unit 11 and a corresponding sound output from the audio output unit 14.

In step S31, the information receiving unit 12 receives notification information after notification of the notification information s provided and supplies it to the information analysis unit 51. The process proceeds to step S32.

In step S32, the information analysis unit 51 analyzes the notification information from the information receiving unit 12 and determines whether urgency of the notification information is high.

If it is determined in step S32 that the urgency of the notification information is high, the process proceeds to step S33.

In step S33, the report control unit 21 controls the audio control unit 22 or the vibration control unit 23 so as to immediately perform the perception improvement process. The audio control unit 22 or the vibration control unit 23 performs a content control process or a vibration control process as the perception improvement process according to the control of the report control unit 21. The process proceeds from step S33 to step S34.

In step S34, the vibration output unit 15 outputs report vibration, so that notification of the notification information is reported.

Note that, if the vibration control unit 23 performs the vibration control process as the perception improvement process in step S33, report vibration corresponding to a vibration signal obtained by the vibration control process is output in step S34. Further, if the vibration control unit 23 does not perform the vibration control process as the perception improvement process in step S33, report vibration corresponding to a vibration signal generated by a predetermined method is output in step S34.

On the other hand, if it is determined in step S32 that the urgency of the notification information is not high, the process proceeds to step S35.

In step S35, the report control unit 21 detects a specific (reproduction) section of an audio signal of the audio content as a report section for outputting the report vibration in response to an analysis result of the audio content by the audio analysis unit 31. The process proceeds to step S36.

In step S36, the report control unit 21 determines whether a current reproduction position of the audio content is a position within the report section (whether the report section is reproduced).

If it is determined in step S36 that the current reproduction position of the audio content is not the position within the report section, the process proceeds to step S37.

In step S37, the report control unit 21 suspends report of notification of the notification information. The process returns to step S36, and a similar process is repeated thereafter.

Then, if it is determined in step S36 that the current reproduction position of the audio content is the position within the report section, the process proceeds to step S33.

In step S33 and step S34, a process similar to the above-described case is performed. With this arrangement, report vibration is output in the report section, and the notification of the notification information is reported.

Note that, if it is determined that the urgency of the notification information is not high, notification of the notification information is reported by outputting the report vibration in the report section, and also notification of the notification information can be reported by outputting report sound in the report section.

Figure 13:
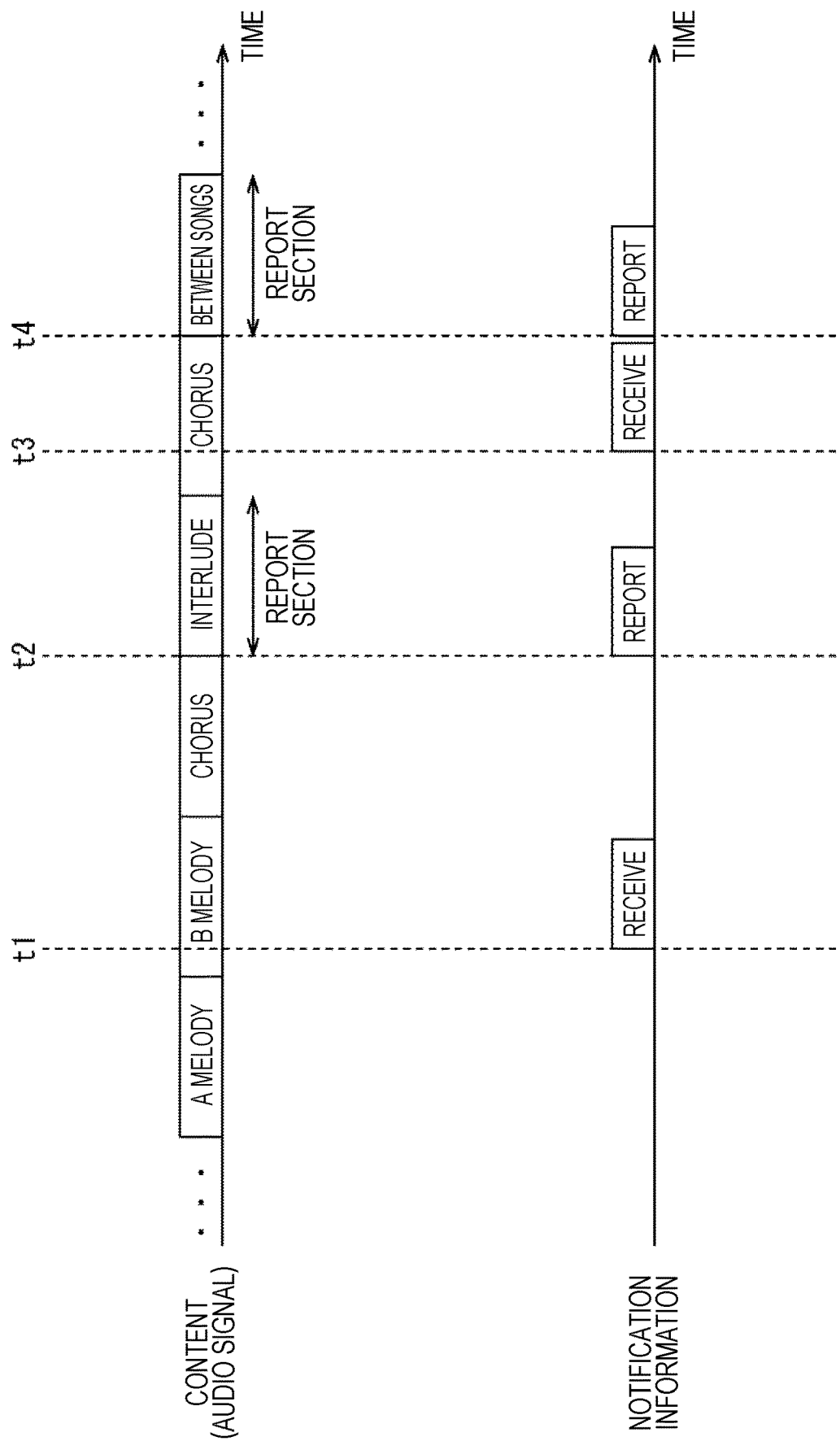
FIG. 13 is a diagram illustrating an example of reporting notification of notification information that is not highly urgent.

FIG. 13 is a diagram illustrating an example of reporting notification of notification information that is not highly urgent.

In FIG. 13, a section of an interlude starting from time t2 immediately after a chorus of a song as audio content and a section between songs starting from time t4 are detected as report sections by analysis or the audio content by the audio analysis unit 31.

Further, in FIG. 13, the notification information is received at time t1 during reproduction of a so-called B melody of the song as the audio content and at time t3 during reproduction of the chorus.

Since there is no report section immediately after the notification information is received at the time t1, report of notification of the notification information is suspended. Then, the notification of the notification information received at the time t1 is reported in a report section starting from the time t2, which is an immediate report section after the time t1.

Similarly, notification of the notification information received at the time t3 is reported in a report section starting from the time t4, which is an immediate report section after the time t3.

Note that in a case where the notification of the notification information which is not highly urgent is reported in the report section, report of the notification of the notification information is suspended until the report section. In a case where music content is, for example, general Japanese popular music, time required from an arbitrary reproduction position of the music content to a report section is estimated to be about several seconds to several minutes from a music structure of the general Japanese popular music. Therefore, in a case where the notification of the notification information is reported in the report section, is presumed that a user's response is delayed by about several seconds to several minutes as compared with a case where the notification is reported immediately after the notification information is received.

On the other hand, in a case where the notification of the notification information is reported immediately after the notification information is received, the notification of the notification information may be reported during reproduction of an exciting section of a song as the audio content, such as a chorus of the song. In this case, it is highly possible that a user concentrates on viewing/listening to the song as the audio content and does not notice the report of the notification of the notification information without the perception improvement process. Then, in a case where the user does not notice the report of the notification of the notification information, the notification information is left for a long time exceeding, for example, about several seconds to several minutes, and a user's response is delayed by such a long time.

On the other hand, in a case where the notification of the notification information is reported in the report section, it is highly possible that the user's response is delayed by about several seconds to several minutes, but it is easier for the user to notice the report. As a result, as described above, time until the user responds to the notification information can be shortened as compared with a case where the notification information is left for a long time.

As described above, according to the present technology, in a case where the notification of the notification information is reported to the user viewing/listening to the audio content, it is possible to suppress hindrance to user's viewing/listening to the music content and report the notification of the notification information so that the user can easily notice it. Further, the time until the user responds to the notification information can be shortened.

Note that, in addition to the vibration, any tactile stimulus that can be sensed by a tactile sense, such as a direct stimulus to a nerve by electricity, a stimulus by air pressure (force sense), a stimulus by temperature, and the like can be adopted for the report of the notification of the notification information. For example, in a case where the direct stimulus to the nerve by the electricity is adopted for the report of the notification of notification information, the stimulus by the electricity so as to be interlocked with a song or the like as audio content is given to a user. Thus, it is possible to suppress hindrance to user's music experience and to report the notification of the notification information to the user in an easily perceptible manner.

<Explanation of Computer to which the Present Technology is Applied>

Next, the series of processes of the control unit 13 described above can be performed by hardware or software. In a case where the series of processes is performed by the software, a program constituting the software is installed on a general-purpose computer or the like.

Figure 14:
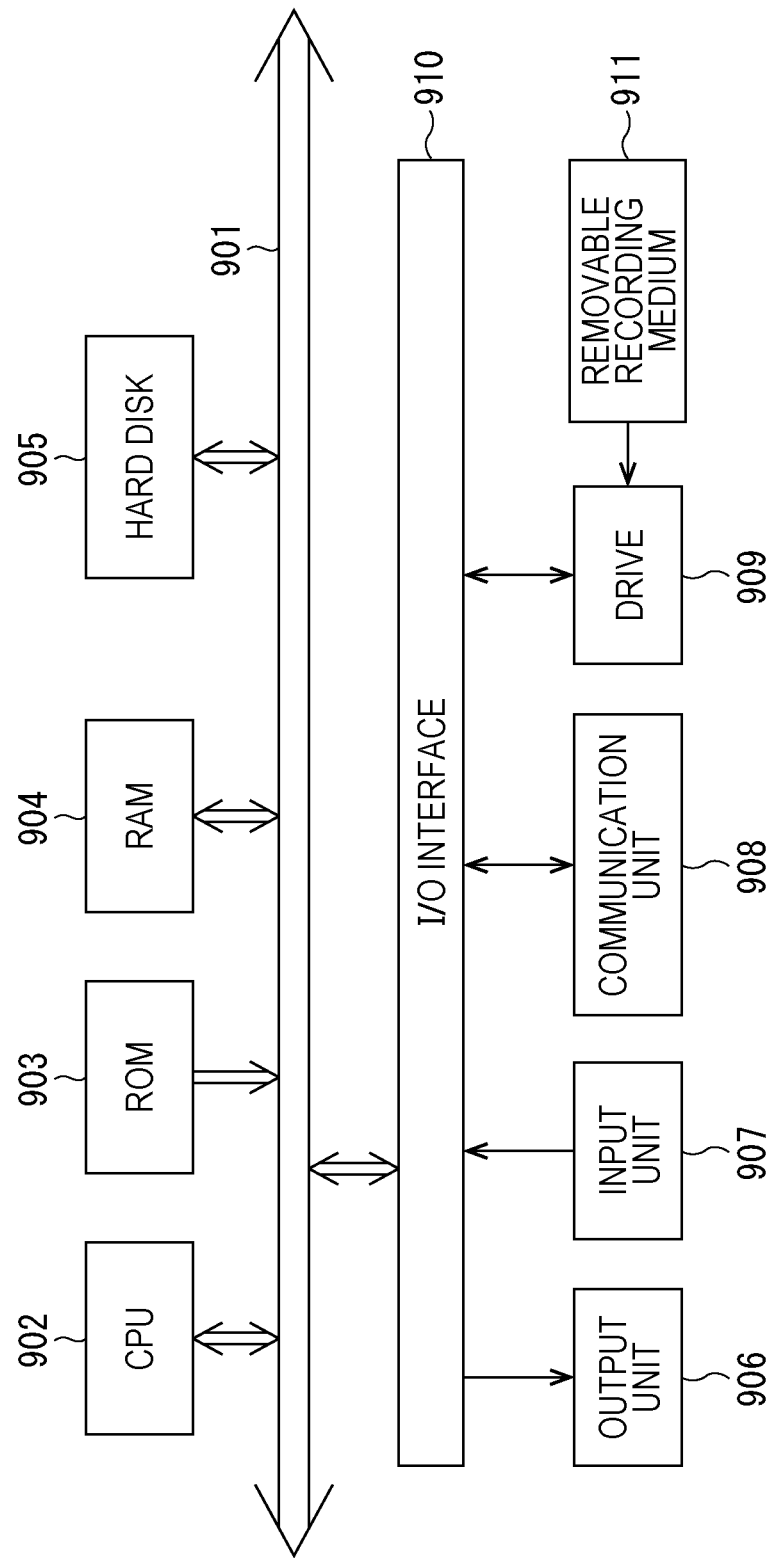
FIG. 14 is a block diagram showing a configuration example of an embodiment of a computer to which the present technology is applied.

FIG. 14 is a block diagram showing a configuration example of an embodiment of a computer on which program for executing the above-mentioned series of processes is installed.

The program can be previously recorded on a hard disk 905 or a ROM 903 as a recording medium built in the computer.

Alternatively, the program can be stored (recorded) in a removable recording medium 911 driven by a drive 909. Such a removable recording medium 911 can be provided as so-called package software. Here, the removable recording medium 911 includes, for example, a flexible disk, a compact disc read only memory (CD-ROM), a magneto optical (MO) disk, a digital versatile disc (DVD), a magnetic disk, a semiconductor memory, and the like.

Note that, in addition to installing the program on the computer from the removable recording medium 911 as described above, the program can be downloaded to the computer via a communication network or a broadcasting network and installed on the built-in hard disk 905. In other words, for example, the program can be transferred wirelessly from a download site to the computer via an artificial satellite for digital satellite broadcasting, or transferred to the computer by wire via a network such as a local area network (LAN) or the Internet.

The computer has a built-in central processing unit (CPU) 902, and an I/O interface 910 is connected to the CPU 902 via a bus 901.

When a command is input by a user through the I/O interface 910 by operating an input unit 907 or the like, the CPU 902 executes the program stored in the read only memory (ROM) 903 accordingly. Alternatively, the CPU 902 loads the program stored in the hard disk 905 into a random access memory (RAM) 904 and executes it.

With this arrangement, the CPU 902 performs the process according to the above-mentioned flowchart or the process performed according to the move-mentioned block diagram configuration. Then, for example, the CPU 902 causes a result of the process to be output from the output unit 906 or transmitted from a communication unit 908, and further recorded on the hard disk 905 via the I/O interface 910, or the like, if necessary.

Note that the input unit 907 includes a keyboard, a mouse, a microphone, and the like. Further, the output unit 906 includes a liquid crystal display (LCD), a speaker, and the like.

Here, in the present specification, the processes performed by the computer according to the program do not necessarily have to be performed in time series in the order described as the flowcharts. In other words, the processes performed by the computer according to the program also includes processing executed in parallel or individually (for example, parallel processing or object processing).

Further, the program may be processed by one computer (processor) or may be distributed and processed by a plurality of computers. Further, the program may be transferred to a distant computer and executed.

Further, in the present specification, the system means a set of a plurality of components (devices, modules (parts), etc.), and it does not matter whether or not all the components are in the same housing. Therefore, a plurality of devices housed in separate housings and connected via a network, and one device housing a plurality of modules in one housing are both systems.

Note that an embodiment of the present technology is not limited to the above-described embodiment, and various modifications can be made without departing from the scope of the present technology.

For example, the present technology can be configured as cloud computing in which one function is shared and jointly processed by a plurality of devices via a network.

Further, each step described in the above-described flowcharts can be executed by one device or shared and executed by a plurality of devices.

Furthermore, in a case where one step includes a plurality of processes, the plurality of processes included in the one step can be executed by one device or shared and executed by a plurality of devices.

Further, the effects described in the present specification are merely examples and are not limited, and there may be other effects.

Note that the present technology can have the following configurations.

<1>

An information processing device including
a control unit that controls output of a tactile stimulus in a case where notification information is received during output of content including sound,
in which the control unit performs a process of controlling the tactile stimulus in response to the content or a process of controlling the content in response to the tactile stimulus.

<2>

The information processing device according to <1>,
in which the control unit controls output of vibration as the tactile stimulus.

<3>

The information processing device according to <2>,
in which the control unit controls a frequency spectrum of the vibration in response to the sound.

<4>

The information processing device according to <2>,
in which the control unit controls output timing of the vibration in response to the sound.

<5>

The information processing device according to <2>,
in which the control unit controls intensity of the vibration in response to volume of the sound.

<6>

The information processing device according to <2>,
in which the control unit controls a frequency spectrum of the sound in response to a frequency spectrum of the vibration.

<7>

The information processing device according to any one of <2> to <6>,
in which in a case where the sound and interlocking vibration interlocked with the sound are output, the control unit controls output of the interlocking vibration when the vibration is output.

<8>

The information processing device according to any one of <2> to <6>,
in which in a case where an external sound capture function that captures an ambient sound into the sound or a noise cancel function that cancels the ambient sound from the sound can be turned on/off, the control unit controls on/off of the external sound capture function or the noise cancel function when the vibration is output.

<9>

The information processing device according to any one of <1> to <8>,
in which the control unit controls output timing of the tactile stimulus in response to urgency of the notification information.

<10>

The information processing device according to any one of <1> to <8>,
in which the control unit outputs the tactile stimulus in a specific section of the sound.

<11>

An information processing method including
performing, using a control unit that controls output of a tactile stimulus in a case where notification information is received during output of content including sound, a process of controlling the tactile stimulus in response to the content or a process of controlling the content in response to the tactile stimulus.

<12>

A program that allows a computer to function as a control unit that controls output of a tactile stimulus in a case where notification information is received during output of content including sound,
in which the control unit performs a process of controlling the tactile stimulus in response to the content or a process of controlling the content in response to the tactile stimulus.

REFERENCE SIGNS LIST

11 Storage unit
12 information receiving unit
13 Control unit
14 Audio output unit
15 Vibration output unit
21 Report control unit
22 Audio control unit
23 Vibration control unit
31 Audio analysis unit
41 External sound processing unit
51 Information analysis unit
901 Bus
902 CPU
903 ROM
904 RAM
905 Hard disk
906 Output unit
907 Input unit
908 Communication unit
909 Drive
910 I/O interface
911 Removable recording medium

The invention claimed is:

1. An information processing device comprising
a control unit configured to
control output of a tactile stimulus in a case where notification information is received during output of content including sound,
perform a process of controlling the tactile stimulus in response to the content or a process of controlling the content in response to the tactile stimulus,
control output of vibration as the tactile stimulus, and
control intensity of the vibration at a time of receiving the notification information in response to volume of the sound output at the time of receiving the notification information,
wherein the control unit is implemented via at least one processor.

2. The information processing device according to claim 1,
wherein the control unit is further configured to control a frequency spectrum of the vibration in response to the sound.

3. The information processing device according to claim 1,
wherein the control unit is further configured to control output timing of the vibration in response to the sound.

4. The information processing device according to claim 1,
wherein the control unit is further configured to control a frequency spectrum of the sound in response to a frequency spectrum of the vibration.

5. The information processing device according to claim 1,
wherein in a case where the sound and interlocking vibration interlocked with the sound are output, the control unit is further configured to control output of the interlocking vibration when the vibration is output.

6. The information processing device according to claim 1,
wherein in a case where an external sound capture function that captures an ambient sound into the sound or a noise cancel function that cancels the ambient sound from the sound can be turned on/off, the control unit is further configured to control on/off of the external sound capture function or the noise cancel function when the vibration is output.

7. The information processing device according to claim 1,
wherein the control unit is further configured to control output timing of the tactile stimulus in response to urgency of the notification information.

8. The information processing device according to claim 1,
wherein the control unit is further configured to output the tactile stimulus in a specific section of the sound.

9. An information processing method comprising
controlling output of a tactile stimulus in a case where notification information is received during output of content including sound,
controlling the tactile stimulus in response to the content or a process of controlling the content in response to the tactile stimulus,
controlling output of vibration as the tactile stimulus, and
controlling intensity of the vibration at a time of receiving the notification information in response to volume of the sound output at the time of receiving the notification information.

10. A non-transitory computer-readable medium having embodied thereon a program, which when executed by a computer causes the computer to execute an information processing method, the method comprising
controlling output of a tactile stimulus in a case where notification information is received during output of content including sound, controlling the tactile stimulus in response to the content or a process of controlling the content in response to the tactile stimulus,
controlling output of vibration as the tactile stimulus, and
controlling intensity of the vibration at a time of receiving the notification information in response to volume of the sound output at the time of receiving the notification information.

\* \* \* \* \*